United States Patent
Woolsey et al.

(10) Patent No.: US 10,057,305 B2
(45) Date of Patent: Aug. 21, 2018

(54) REAL-TIME SHARING DURING A PHONE CALL

(71) Applicant: MICROSOFT TECHNOLOGY LICENSING, LLC, Redmond, WA (US)

(72) Inventors: Kerry Woolsey, Duvall, WA (US); Peter Hammerquist, Shoreline, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 106 days.

(21) Appl. No.: 14/482,960

(22) Filed: Sep. 10, 2014

(65) Prior Publication Data

US 2016/0072861 A1 Mar. 10, 2016

(51) Int. Cl.
| | |
|---|---|
| *H04L 29/06* | (2006.01) |
| *H04L 12/58* | (2006.01) |
| *H04L 29/08* | (2006.01) |
| *H04W 4/14* | (2009.01) |
| *H04W 4/16* | (2009.01) |
| *G06F 3/0484* | (2013.01) |

(52) U.S. Cl.
CPC ........ *H04L 65/4007* (2013.01); *G06F 3/0484* (2013.01); *H04L 51/046* (2013.01); *H04L 67/1095* (2013.01); *H04W 4/14* (2013.01); *H04W 4/16* (2013.01)

(58) Field of Classification Search
CPC .................................................. H04L 65/4007
See application file for complete search history.

(56) References Cited

U.S. PATENT DOCUMENTS

| | | | |
|---|---|---|---|
| 7,483,418 B2 | 1/2009 | Maurer | |
| 2005/0036509 A1* | 2/2005 | Acharya | H04L 63/0428 370/466 |

(Continued)

OTHER PUBLICATIONS 15 cool things Cortana can do in Windows 10, slide 9, "Find pictures from last week," Sarah Jacobsson Purewal, Oct. 7, 2016, available at https://www.cnet.com/pictures/15-cool-things-cortana can do in windows-10/9/ (Year: 2016).*

(Continued)

*Primary Examiner* — David Orange
(74) *Attorney, Agent, or Firm* — Mark K. Young; Mayer & Williams, PC

(57) ABSTRACT

A real-time sharing component operating on a computing device such as a smartphone, tablet, or personal computer (PC) is configured to enable a local sharing party to share content with a remote party during a phone call. The real-time sharing component exposes tools, controls, and functions that enable the shared content to be a curated experience in which content available to the sharing party can be selected and shared with the remote party with voice narration while controlling the pacing of the sharing, maintaining privacy so that only intentionally shared content can be seen by the remote party but not other content, and controlling how and when shared content can be saved by the remote party, and enabling the shared content to be zoomed and panned and be highlighted with graphics and/or annotated with text.

17 Claims, 26 Drawing Sheets

(56) References Cited

U.S. PATENT DOCUMENTS

| | | | |
|---|---|---|---|
| 2005/0172121 A1* | 8/2005 | Risan | G06F 21/10 |
| | | | 713/164 |
| 2010/0054601 A1* | 3/2010 | Anbalagan | G06F 17/30265 |
| | | | 382/180 |
| 2010/0080361 A1 | 4/2010 | Houghton | |
| 2011/0044438 A1 | 2/2011 | Wang et al. | |
| 2012/0287231 A1 | 11/2012 | Ravi et al. | |
| 2012/0317483 A1 | 12/2012 | Shapiro et al. | |
| 2013/0003951 A1 | 1/2013 | Pitschel et al. | |
| 2014/0018053 A1* | 1/2014 | Cho | G06F 3/0488 |
| | | | 455/418 |
| 2014/0081633 A1* | 3/2014 | Badaskar | G06F 17/30023 |
| | | | 704/235 |
| 2014/0122726 A1 | 5/2014 | Jafry et al. | |
| 2014/0282013 A1* | 9/2014 | Amijee | G06F 17/30056 |
| | | | 715/732 |

OTHER PUBLICATIONS

"International Search Report & Written Opinion Issued in PCT Application No. PCT/US2015/049262", dated Nov. 27, 2015, (10 Pages total).

Winkler, et al., "Interactive Phone Call: Synchronous Remote Collaboration and Projected Interactive Surfaces", In Proceedings of the ACM International Conference on Interactive Tabletops and Surfaces, Nov. 13, 2011, (10 pages total).

Gunaratne, et al., "Newport: Enabling Sharing During Mobile Calls", In Proceedings of the 28th International Conference on Human Factors in Computing Systems, Apr. 10, 2010, (10 pages total).

"New App Makes Photo and Document Sharing During a Phone Call a Cinch", Published on: Feb. 18, 2014, Retrieved from: http://www.marketwired.com/press-release/new-app-makes-photo-and-document-sharing-during-a-phone-call-a-cinch-1879586.htm Retrieved on: Apr. 7, 2014 (2 pages total).

"Second Written Opinion Issued in PCT Application No. PCT/US2015/049262", dated Aug. 23, 2016, (5 Pages total).

"International Preliminary Report on Patentability Issued in PCT Application No. PCT/US2015/049262", dated Nov. 30, 2016, 7 Pages.

* cited by examiner

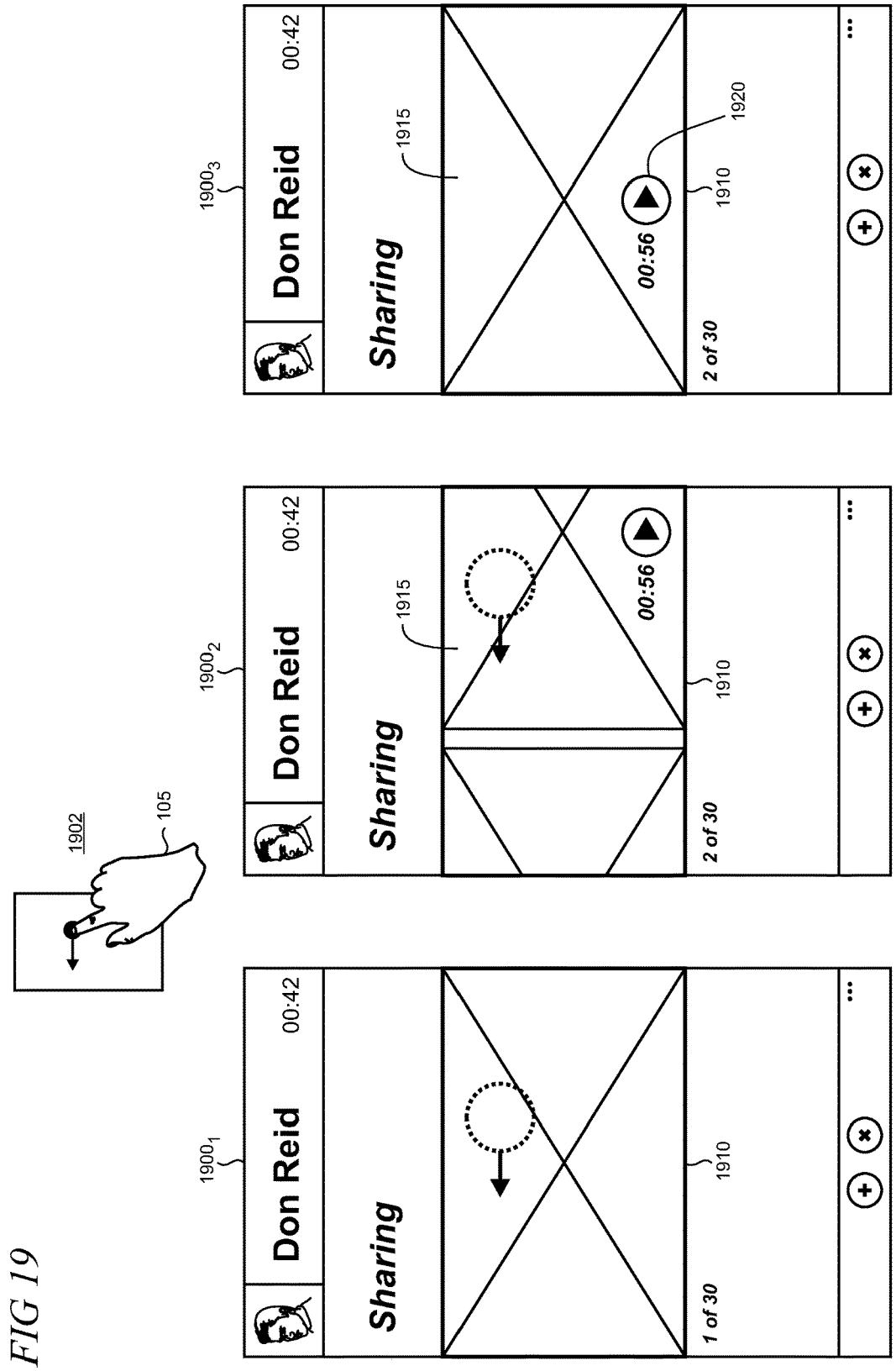

REAL-TIME SHARING DURING A PHONE CALL

BACKGROUND

People often want to share personal information while on the phone, and oftentimes content that is on their phone or computer will help them effectively share while they are talking during the call. Traditional smartphones can implement asynchronous sharing in which the person sends photos, videos, or documents over email, text messaging, posts to a social network or to a cloud storage system, and the like. While such asynchronous sharing can perform satisfactorily in many applications and allows content sharing, the user experience can still be somewhat disjointed and disconnected.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A real-time sharing component operating on a computing device such as a smartphone, tablet, or personal computer (PC) is configured to enable a local sharing party to share content with a remote party during a phone call. The real-time sharing component exposes tools, controls, and functions that enable the shared content to be a curated experience in which content available to the sharing party can be selected and shared with the remote party with voice narration while controlling the pacing of the sharing, maintaining privacy (so that only intentionally shared content can be seen by the remote party but not other content), and controlling how and when shared content can be saved by the remote party, and enabling the shared content to be zoomed and panned and be highlighted with graphics and/or annotated with text.

In various illustrative examples, the shared content can include different types of content that is stored on the sharing party's device (and/or is available to it from remote stores) such as photos, documents, files, video, audio, applications, location and contact information, and the like. Shared content can also include live captured content such as photos, video, audio, etc. In cases in which the remote party's device is not configured with a real-time sharing component, an external web service can be used to provide the curated sharing experience on the remote device through a conventional web browser without needing to install a client application.

Advantageously, by enabling the sharing to be a curated experience for the remote party in which the content presentation appears cohesive, organized, and professional with smooth transitions between pieces of shared content, the real-time sharing component places the sharing party in a positive light while making it easy to share within a phone call experience without having to launch and toggle between multiple applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIGS. 11-30 show screen captures of illustrative user interfaces (UIs) displayed on a device at various points in a sharing session during a phone call;

Figure 1:
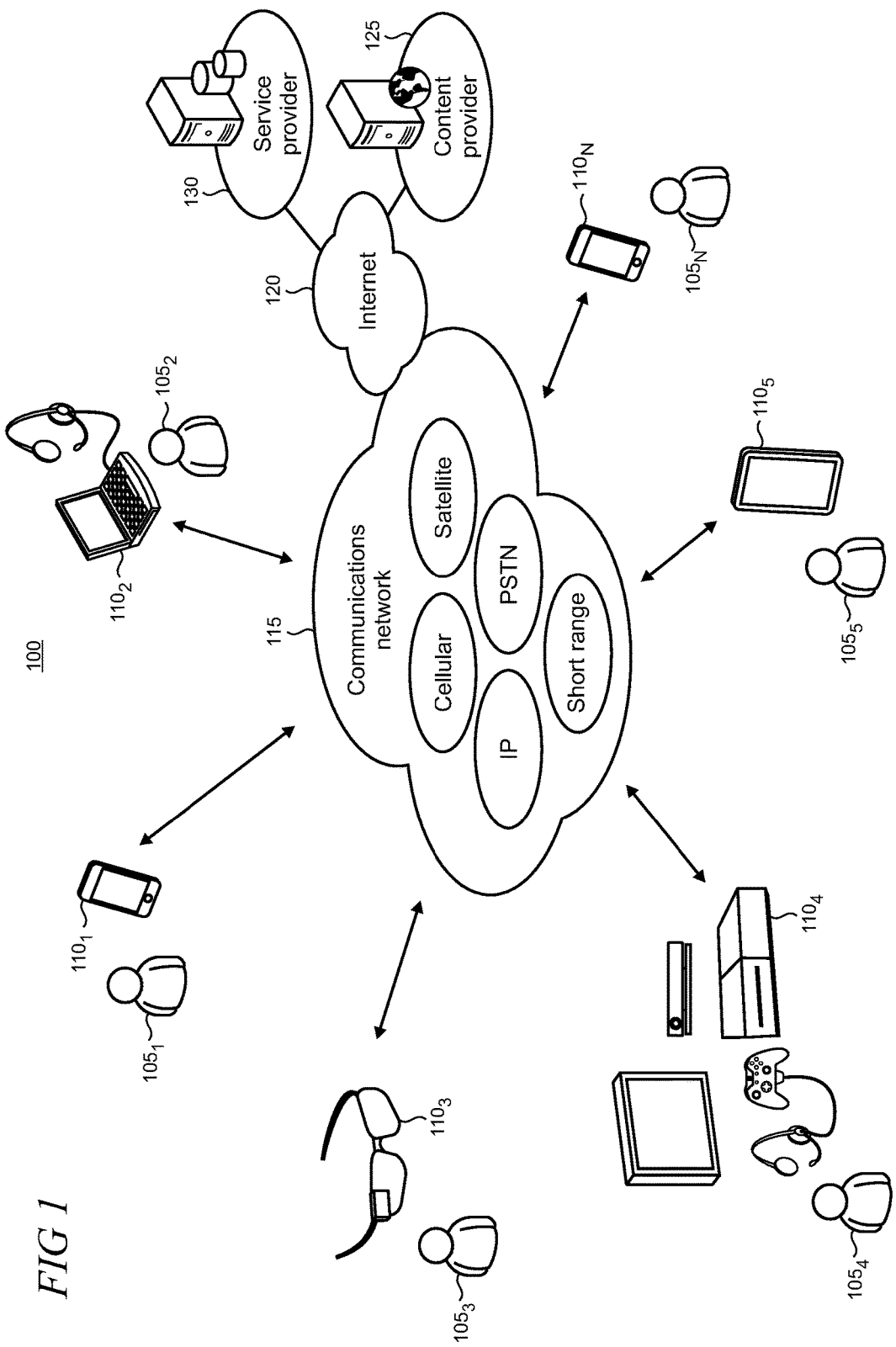
FIG. 1 shows an illustrative environment in which devices having communications capabilities interact over a network.

Like reference numerals indicate like elements in the drawings. Elements are not drawn to scale unless otherwise indicated. It is emphasized that the particular UIs displayed in the drawings can vary from what is shown according to the needs of a particular implementation. While UIs are shown in portrait mode in the drawings, the present arrangement may also be implemented using a landscape mode.

DETAILED DESCRIPTION

During conventional asynchronous sharing during a phone conversation, the use of a smartphone, personal computer (PC), or other computing platform can often be a disjointed and disconnected experience for both the sharing party and the remote party who receives the shared content. The remote party may look at the shared content, such as a photo slideshow, at a different pace than the sending party as they are discussing the content. The sending party is also typically unable to call out specific areas of the content to be highlighted or to which to have the attention of the remote party drawn. Confusion can develop and the sending party constantly has to check to confirm what the remote party is viewing at particular moments in the phone call. This problem can be especially exacerbated if there are multiple shared content items to be managed. The sharing party can also lose control of the content if it is available for saving on the remote party's device.

The present real-time sharing during a phone call provides a user experience during a phone call that mirrors the experience when sharing is performed in the same physical location—the sharing party is able to control the pace of shared content presentation, highlight specific areas in the content, and control privacy as the real-time sharing component protects content that is not intended for sharing from being seen by the remote party and enables user control over whether the shared content can be saved by the remote party.

Turning now to the drawings, FIG. 1 shows an illustrative communications environment 100 in which various users 105 employ respective devices 110 that communicate over a communications network 115. The devices 110 provide various communication capabilities, such as voice and video calling and messaging, and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting), use applications and access services that employ data, browse the World Wide Web, and the like. However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, phablet devices (i.e., combination smartphone/tablet devices), wearable computers, navigation devices such as GPS (Global Positioning System) systems, laptop PCs (personal computers), desktop computers, multimedia consoles, gaming systems, networked and/or remotely controlled cameras (e.g., room and home surveillance cameras, body-worn cameras, webcams, external cameras used with PCs, tablets, and other computing devices, remote cameras in vehicles, etc.), or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access the communications network 115 in order to implement various user experiences. The communications network can include any of a variety of network types and network infrastructure in various combinations or sub-combinations including cellular networks, satellite networks, IP (Internet Protocol) networks such as Wi-Fi and Ethernet networks, a public switched telephone network (PSTN), and/or short range networks such as Bluetooth networks. The network infrastructure can be supported, for example, by mobile operators, enterprises, Internet service providers (ISPs), telephone service providers, data service providers, and the like. The communications network 115 typically includes interfaces that support a connection to the Internet 120 so that the mobile devices 110 can access content provided by one or more content providers 125 and access a service provider 130 in some cases.

Figure 2:
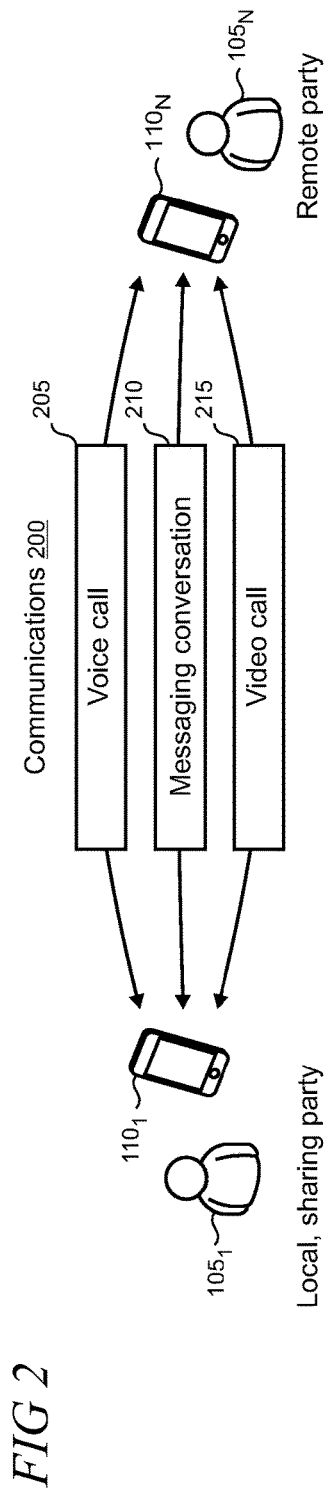
FIG. 2 shows illustrative communications between devices.

The devices 110 and communications network 115 may be configured to enable device-to-device communication. As shown in FIG. 2, such device-to-device communication 200 can include, for example, voice calls 205, messaging conversations 210, and video calls 215. Support for device-to-device communication 200 may be provided using various applications that run on a device 110.

Figure 3:
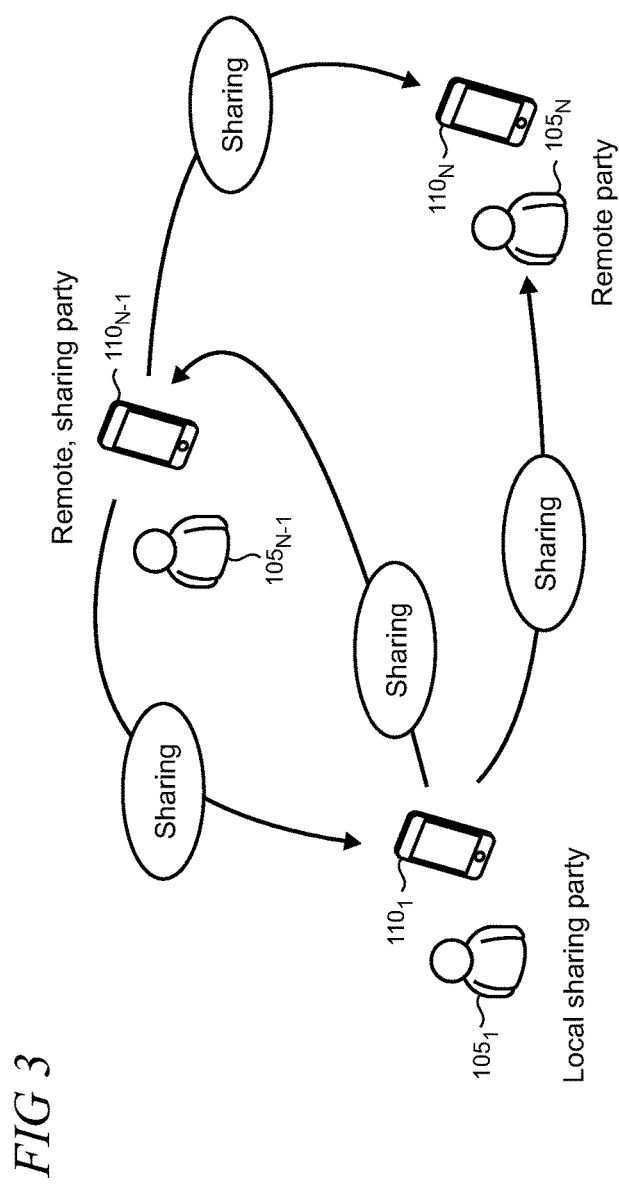
FIG. 3 shows illustrative sharing among multiple device users.

The communications 200 can be utilized to support the present real-time sharing during a phone call. The sharing can be implemented between a local sharing party $105_l$ and a single remote party $105_N$ or between the local sharing party and multiple remote parties in a conference call scenario as shown in FIG. 3. In some cases, one or more of the remote parties can also implement sharing back with the local and/or with another party. Sharing may also be implemented using more than one network connection. For example, audio associated with a phone call and sharing session may be carried in part over a PSTN or mobile operator network while shared content such as pictures, video, etc., can be carried over a Wi-Fi or other network.

Figure 4:
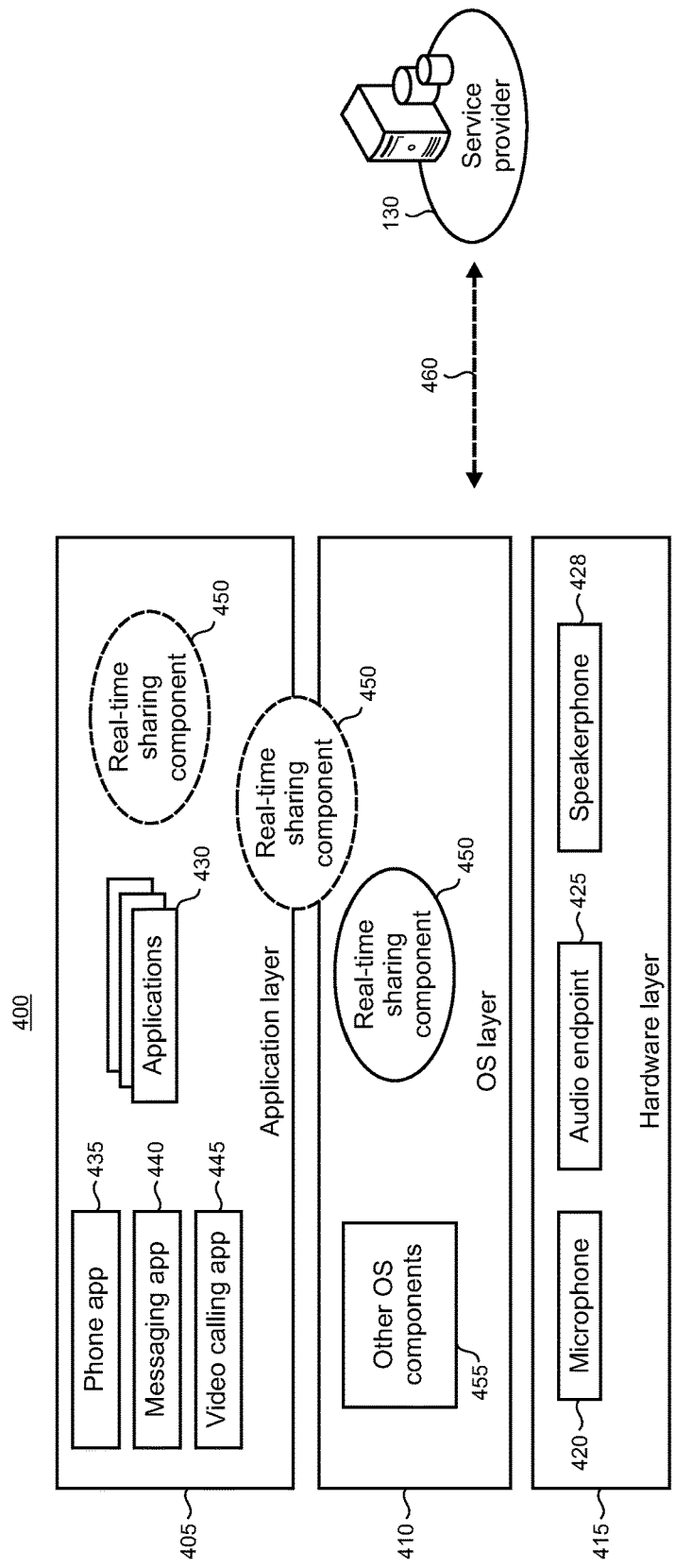
FIG. 4 shows an illustrative layered architecture that includes an application layer, operating system (OS) layer, and hardware layer.

The present real-time sharing during a phone call may be implemented using components that are instantiated on a given device. In addition, as discussed below, real-time sharing can also be implemented, in whole or part, using a web service supported by a remote service provider (e.g., service provider 130 in FIG. 1). FIG. 4 shows an illustrative layered architecture 400 that supports communication applications and other components. The architecture 400 is typically implemented in software, although combinations of software, firmware, and/or hardware may also be utilized in some cases. The architecture 400 is arranged in layers and includes an application layer 405, an OS (operating system) layer 410, and a hardware layer 415. The hardware layer 415 provides an abstraction of the various hardware used by the device 110 (e.g., input and output devices, networking and radio hardware, etc.) to the layers above it. In this illustrative example, the hardware layer supports a microphone 420 and audio endpoint 425 which may include, for example, a wired or wireless headset/earpiece, external speaker/device, and the like, and the device's speakerphone 428.

The application layer 405 in this illustrative example supports various applications (apps) 430 (e.g., web browser, map application, email application, etc.), as well as a phone app 435, messaging app 440, and video calling app 445, such as Skype™. The applications are often implemented using locally executing code. However in some cases, these applications may rely on services and/or remote code execution provided by remote servers or other computing platforms such as those supported by the service provider 130 or other cloud-based resources as indicated by line 460. While the apps 430, 435, 440, and 445 are shown here as components that are instantiated in the application layer 405, it may be appreciated that the functionality provided by a given application may be implemented, in whole or part, using components that are supported in either the OS or hardware layers.

The OS layer 410 supports a real-time sharing component 450 and various other OS components 455. In some cases, real-time sharing component 450 can interact with the service provider. That is, the real-time sharing component 450 in some implementations can partially utilize or fully utilize remote code execution supported at the service provider 130, or using other remote resources. In addition, it may utilize and/or interact with the other OS components 455 (and/or other components that are instantiated in the other layers of the architecture 400) as may be needed to implement the various features and functions described herein. The real-time sharing component 450 may alternatively be instantiated using elements that are instantiated in both the OS and application layers or be configured as an application, as shown in FIG. 4 using the dashed ovals. It may also be appreciated that the functionality provided by the real-time sharing component 450 can be implemented, in whole or part, using components that are supported in either the application or hardware layers.

Figure 5:
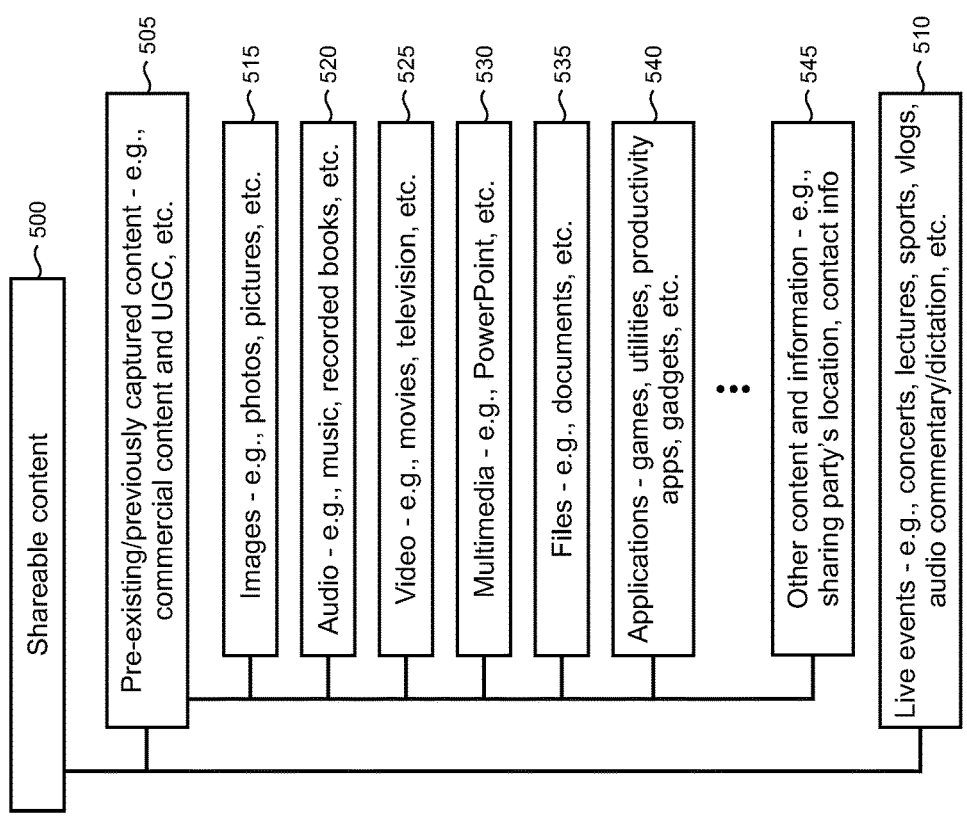
FIG. 5 shows an illustrative taxonomy of shareable content.

Various types of content can be shared using the present real-time sharing. FIG. 5 shows an illustrative taxonomy of shareable content 500. It is noted that the shareable content can be stored locally on a device, or be stored remotely from the device but still be accessible to the device. For example, the shareable content can be stored in a cloud store, be available on a network such as a local area network, be accessed using a connection to another device, and the like.

As shown in FIG. 5, the shareable content 500 can include both pre-existing/previously captured content 505 (e.g., commercially available content and/or user-generated content (UGC), etc.), as well as content 510 associated with live events (e.g., concerts, lectures, sporting events, audio commentary/dictation, video logs (vlogs), etc.). The shareable content shown in FIG. 5 is illustrative and not intended to be exhaustive. The types of content utilized can vary according the needs of a particular implementation.

Illustrative examples of pre-existing shareable content include images 515, audio 520, video 525, multimedia 530, files 535, applications 540, and other shareable content 545 such as the sharing party's location and/or contact information.

Figure 6:
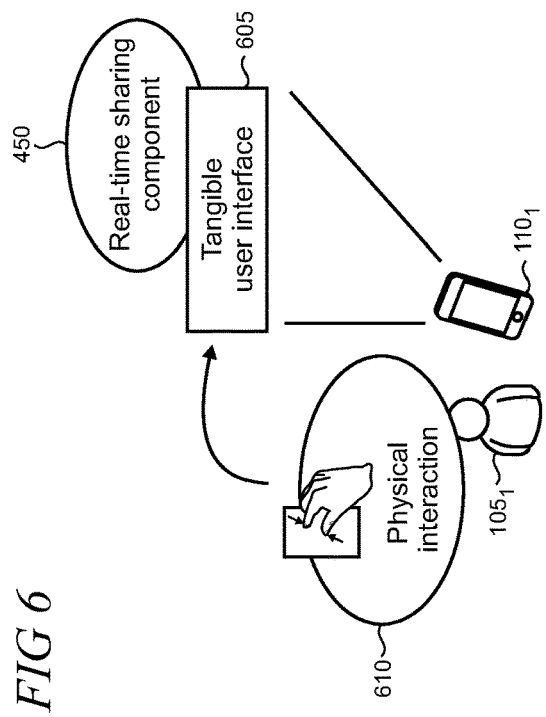
FIGS. 6, 7, and 8 show illustrative interfaces between a user and a real-time sharing component.
Figure 8:
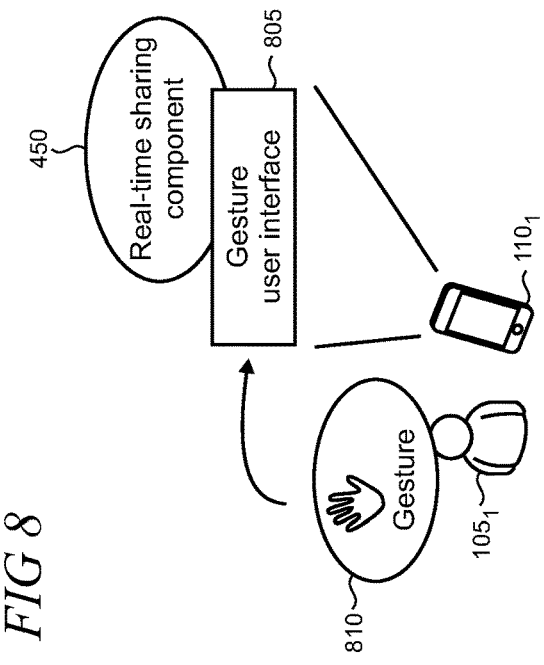
Figure 7:
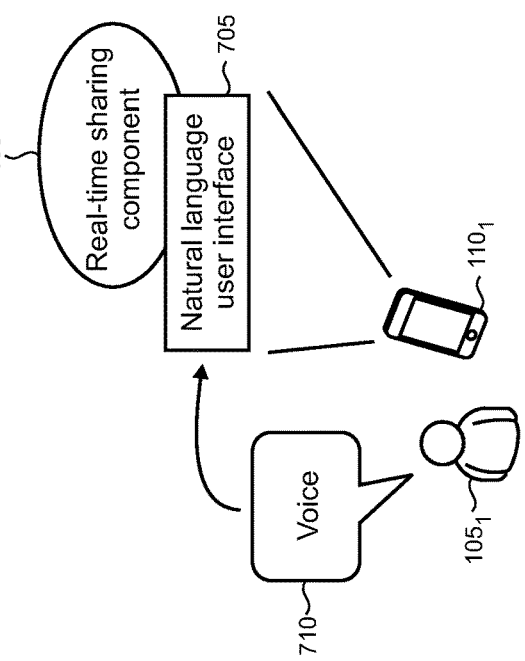

A user can typically interact with the real-time sharing component 450 (FIG. 4) in a number of ways depending on the features and functionalities supported by a given device 110. For example, as shown in FIG. 6, the real-time sharing component 450 may expose a tangible user interface 605 that enables the user 105 to employ physical interactions 610 in support of the real-time sharing of user experiences on the device 110. Such physical interactions can include manipulation of physical and/or virtual controls such as buttons, menus, keyboards, etc., using touch-based inputs like tapping, flicking, dragging, etc. on a touchscreen, and the like. In some implementations, the real-time sharing component may expose a natural language user interface 705 shown in FIG. 7, or alternatively a voice command-based user interface (not shown), with which the user employs voice 710 to provide various inputs to the device 110. In other implementations, the real-time sharing component 450 may expose a gesture user interface 805 shown in FIG. 8 with which the user 105 employs gestures 810 to provide inputs to the device 110. It is noted that in some cases, combinations of user interfaces may be utilized where the user may employ, for example, both voice and physical inputs to interact with the real-time sharing component 450 and the device 110. The user gestures can be sensed using various techniques such as optical sensing, touch sensing, proximity sensing, and the like.

Figure 9:
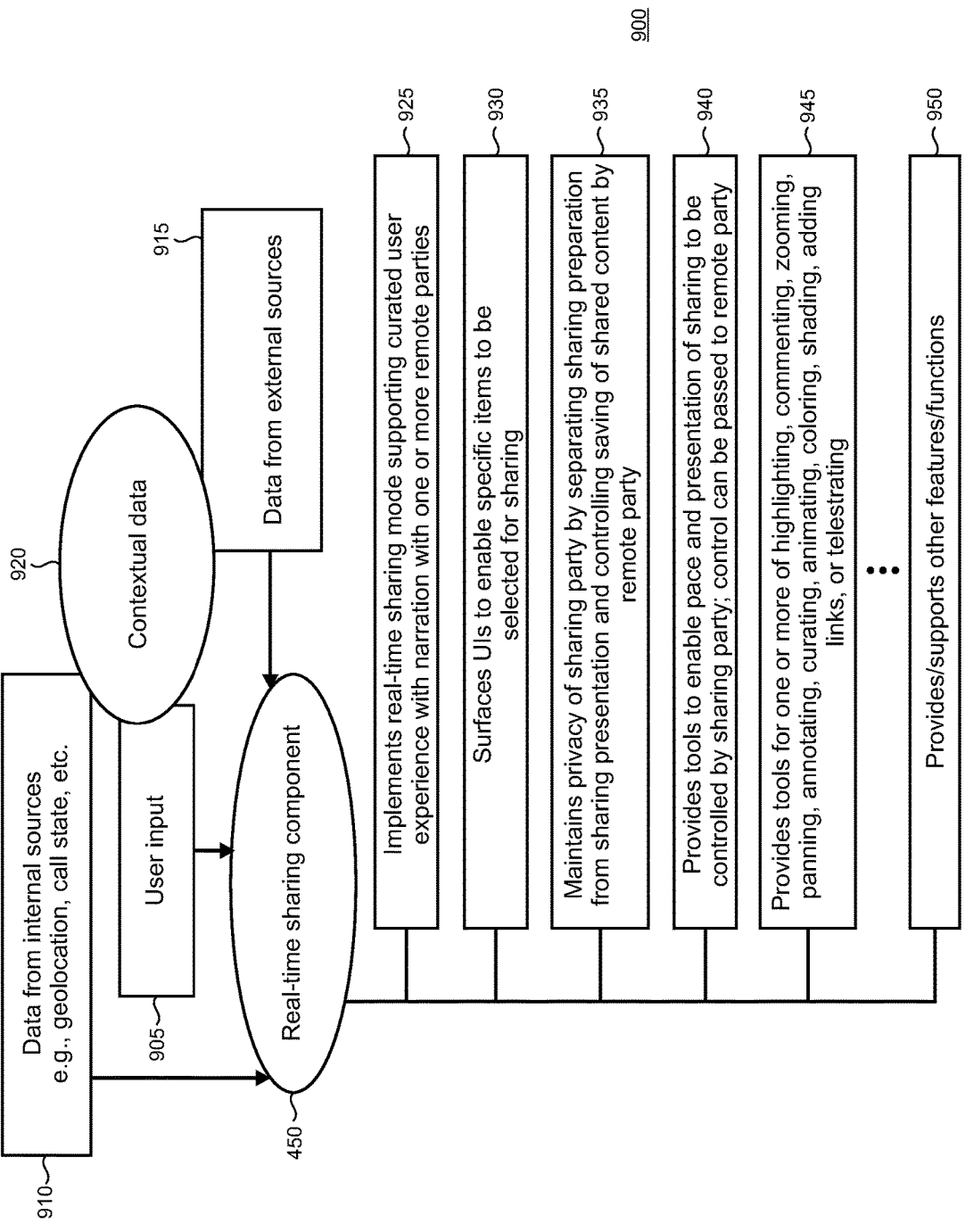
FIG. 9 shows illustrative inputs to the real-time sharing component and an illustrative taxonomy of features and functions that may be supported by the real-time sharing component.

FIG. 9 shows an illustrative taxonomy of functions 900 that may typically be supported by the real-time sharing component 450. Inputs to the real-time sharing component 450 typically can include user input 905 (in which such user input can include input from either or both the local and remote parties to a given sharing session in some cases), data from internal sources 910, and data from external sources 915. For example, data from internal sources 910 could include the current geolocation of the device 110 that is reported by a GPS (Global Positioning System) component on the device, or some other location-aware component. The externally sourced data 915 includes data provided, for example, by external systems, databases, services, and the like such as the service provider 130 (FIG. 1). The various inputs can be used alone or in various combinations to enable the real-time sharing component 450 to utilize contextual data 920 when it operates. Contextual data can include, for example, time/date, the user's location, language, schedule, applications installed on the device, the user's preferences, the user's behaviors (in which such behaviors are monitored/tracked with notice to the user and the user's consent), stored contacts (including, in some cases, links to a local user's or remote user's social graph such as those maintained by external social networking services), call history, messaging history, browsing history, device type, device capabilities, communications network type and/or features/functionalities provided therein, mobile data plan restrictions/limitations, data associated with other parties to a communication (e.g., their schedules, preferences, etc.), and the like. Additional illustrative examples of the use of context by the real-time sharing component are provided below.

As shown, the functions 900 illustratively include implementing a real-time sharing mode that supports a curated user experience with narration (as indicated by reference numeral 925. Such curated user experience can be implemented with a single remote party and/or multiple remote parties and the sharing can go in both directions in some cases (as shown in FIG. 3 and described in the accompanying text). The functions 900 may also include surfacing various UIs to enable specific items to be selected for sharing (930); maintaining privacy of the sharing party by separating sharing preparation from sharing presentation and controlling how shared content is saved by the remote party (935); providing tools for the user to control the pace and presentation of the sharing (940) where such control can be selectively passed to the remote party, as described below; providing tools for highlighting, commenting, zooming, panning, annotating, curating, animating, coloring, shading, adding links to additional content or experiences, or telestrating (945); and providing and supporting other features and functionalities (950). The list of functions 900 is not intended to be exhaustive and other functions may be provided by the real-time sharing component as may be needed for a particular implementation of the present real-time sharing during a phone call.

Figure 10:
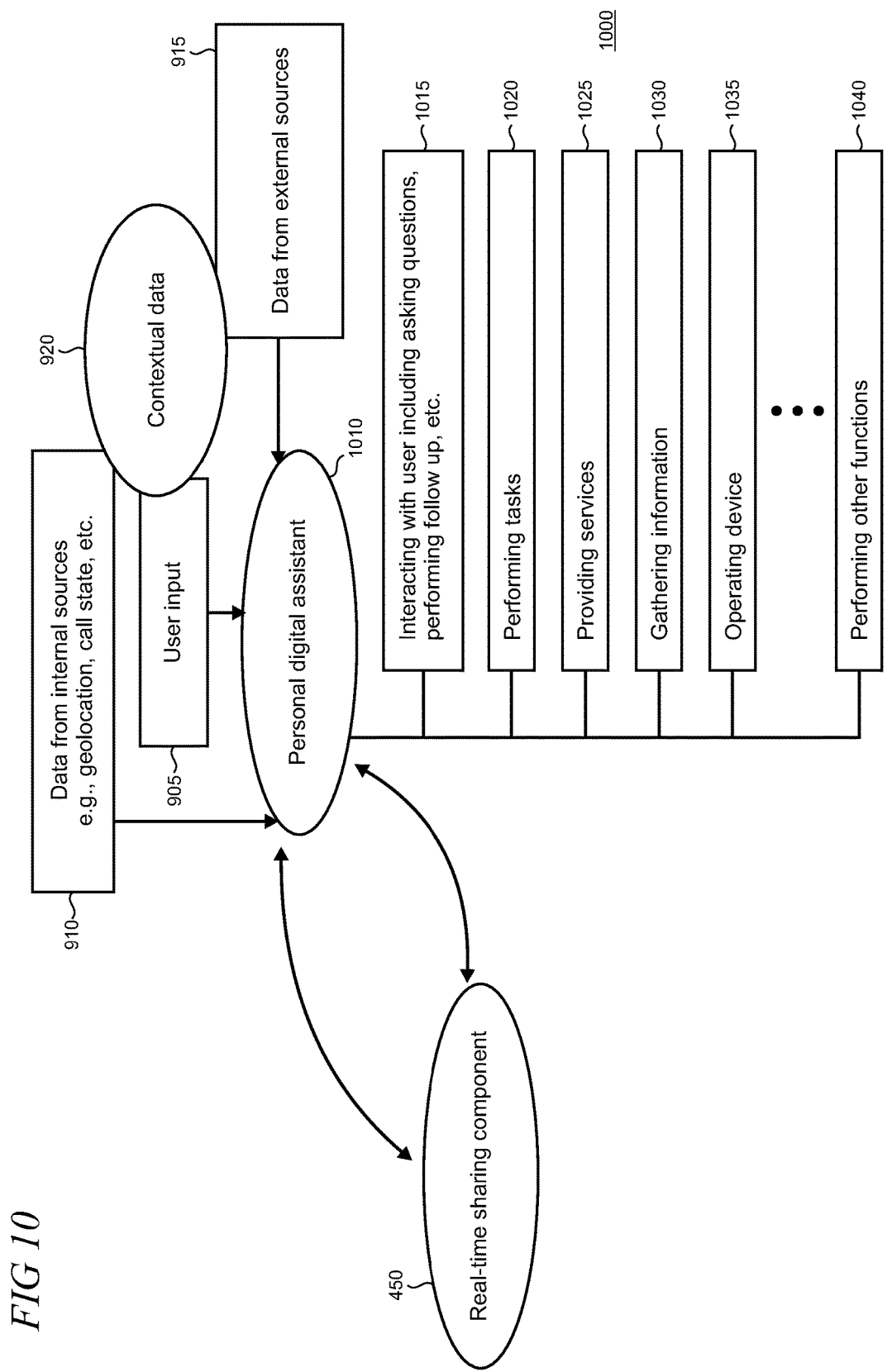
FIG. 10 shows an illustrative arrangement in which the real-time sharing component interacts with a digital assistant that may be instantiated on a device.

In some implementations, the real-time sharing component 450 can be configured to interoperate with a personal digital assistant that is operable on the device 110. As shown in FIG. 10, a personal digital assistant 1010 can expose a variety of functions 1000 which illustratively include interacting with the user 1015 (through the natural language user interface and/or other user interfaces, for example); performing tasks 1020 (e.g., making note of appointments in the user's calendar, sending messages and emails, etc.); providing services 1025 (e.g., answering questions from the user, mapping directions to a destination, etc.); gathering information 1030 (e.g., finding information requested by the user about a book or movie, locating the nearest Italian restaurant, etc.); operating the device 1035 (e.g., setting preferences, adjusting screen brightness, turning wireless connections such as Wi-Fi and Bluetooth on and off, etc.); and performing various other functions 1040. The list of functions 1000 is not intended to be exhaustive and other functions may be provided by the digital assistant as may be needed for a particular implementation of the present real-time sharing during a phone call.

In a similar manner as with the arrangement shown in FIG. 9, inputs to the digital assistant 1010 can include user input 905, data from internal sources 910, data from external sources 915, and contextual data 920.

Figure 11:
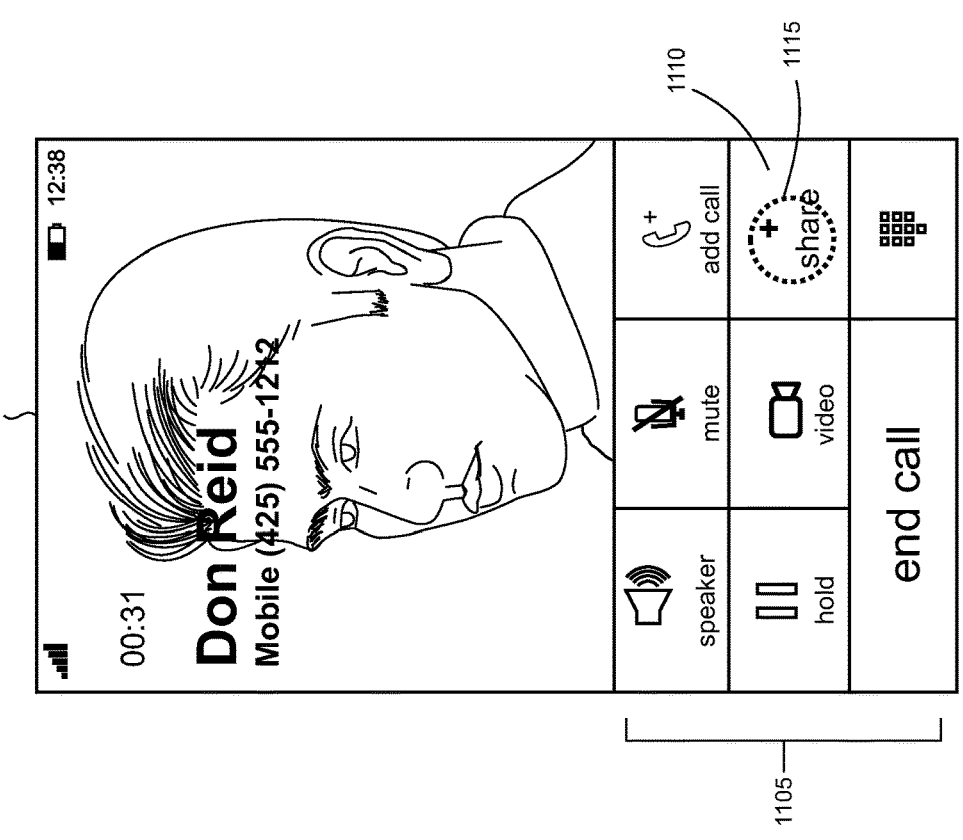
Figure 13:
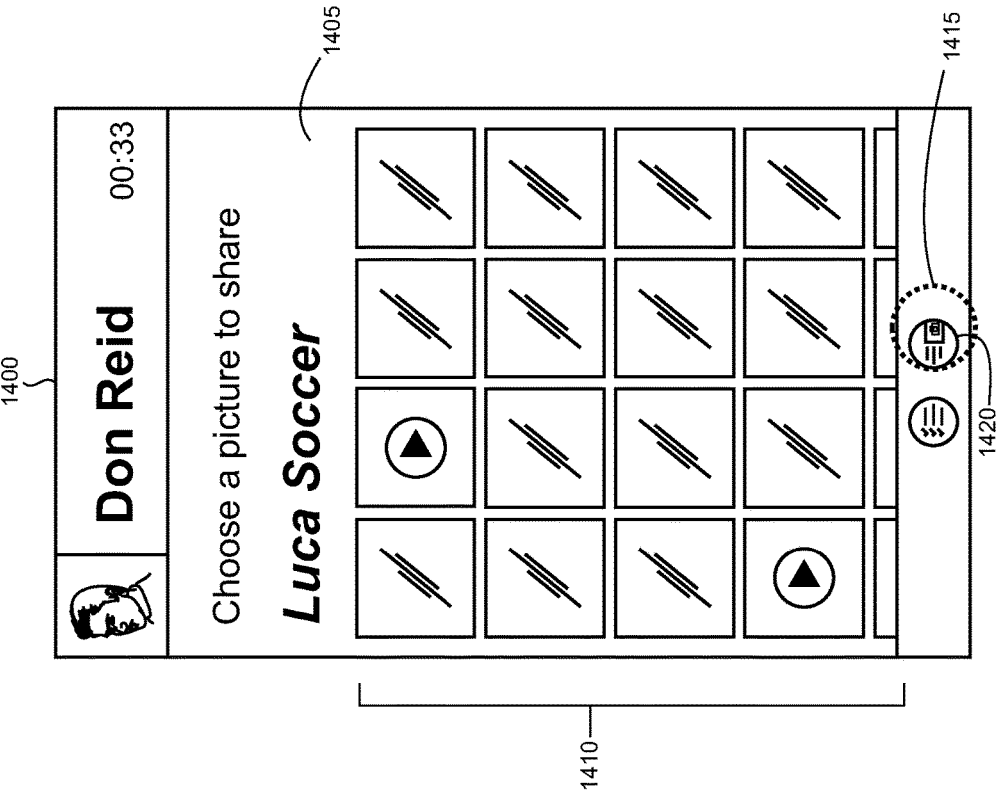

FIGS. 11-30 show screen captures of illustrative real-time sharing user interfaces (UIs) displayed on a device at various points in a sharing session during a phone call. FIG. 11 shows a UI 1100 that can be exposed by the voice calling phone app 435 (FIG. 4) as a phone call is initiated by the local sharing party to the remote party. In this particular example, the call and sharing are implemented with a single remote party. However, it may be appreciated that this example is illustrative and that multi-party (i.e., conference calling) may also be implemented using the present real-time sharing. It is noted that all the UIs shown in the drawings are intended to be illustrative and that the presentation of information, exposed features and controls, and the overall look and feel of the UI can vary from what is shown by implementation. As shown in FIG. 11, the UI 1100 shows a picture and name of the called party (i.e., the remote party, here named "Don Reid"), the dialed number, and various call controls 1105 at the bottom of the UI.

Figure 12:
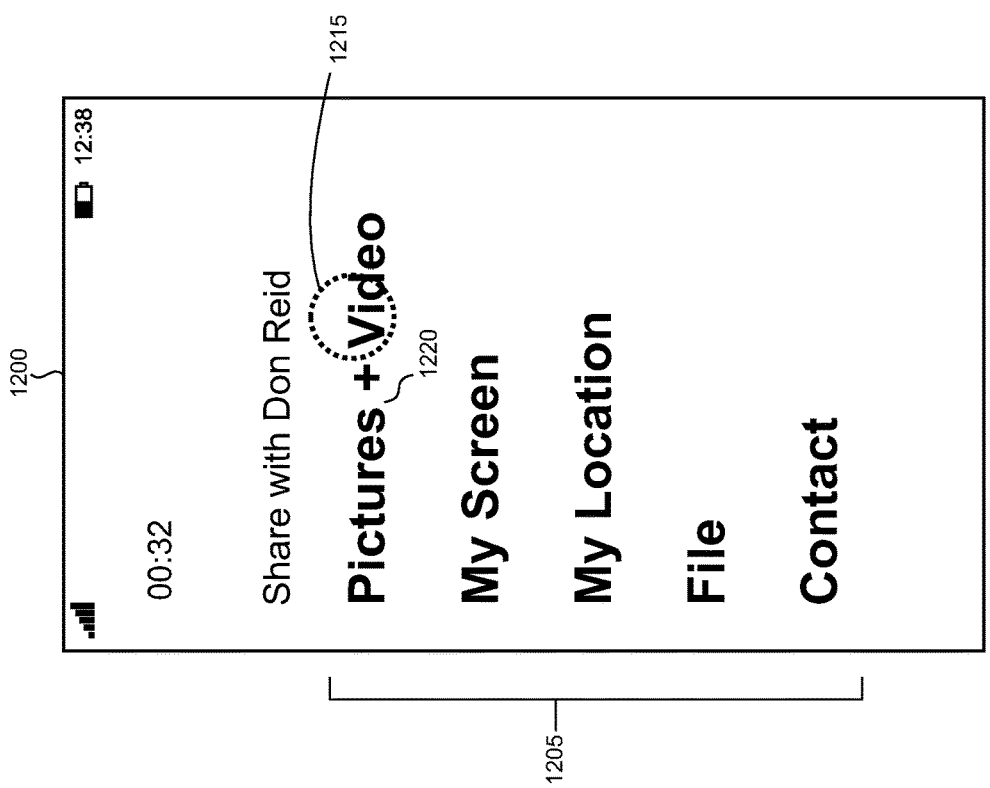

When the user (i.e., the local sharing party) selects a share button 1110 that is exposed on the phone app's UI, here using a touch 1115 on a touch screen or other interaction, a sharing UI 1200 is surfaced as shown in FIG. 12 so that the user can initiate a real-time sharing session with the remote party. The real-time sharing component 450 (FIG. 4) typically will automatically switch the device to operate in speakerphone mode so that the user can continue to converse with the remote party while interacting with the real-time sharing UIs.

The UI 1200 provides a number of sharing options 1205 that can be invoked by the user by touch. In this example, the user employs a touch 1215 to select the pictures and video option 1220 among various options to share various other types of content. The user's selection action surfaces UI 1300 in FIG. 13 which provides a vertically scrollable window 1305 of albums of content that are available for sharing with the remote party and the user has selected an album of content 1310 named "Luca Soccer" using a touch 1315. In an alternative implementation, the user may invoke the personal digital assistant 1010 (FIG. 10) or similar utility available to the local device to select content for sharing. Thus, using a natural language interface to the personal digital assistant, the user may say "find photos and video of my hike last weekend." or "show me pictures with my dad." or "show me pictures with me and my wife taken in Mexico last month" and the personal digital assistant 1010 can parse the statements to locate and surface the appropriate content.

Figure 14:
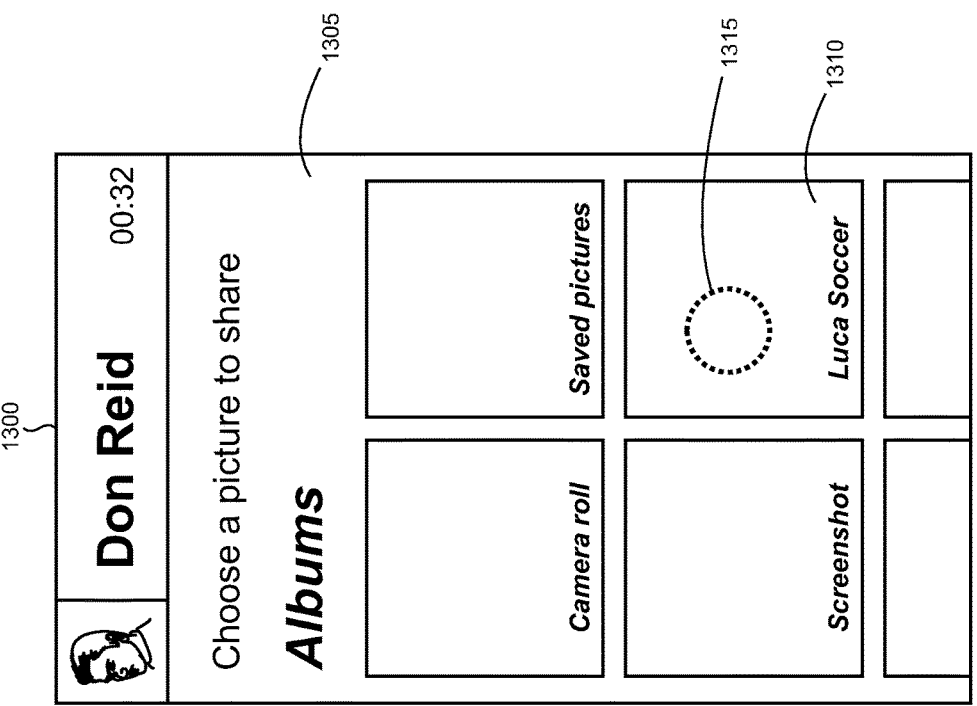
Figure 16:
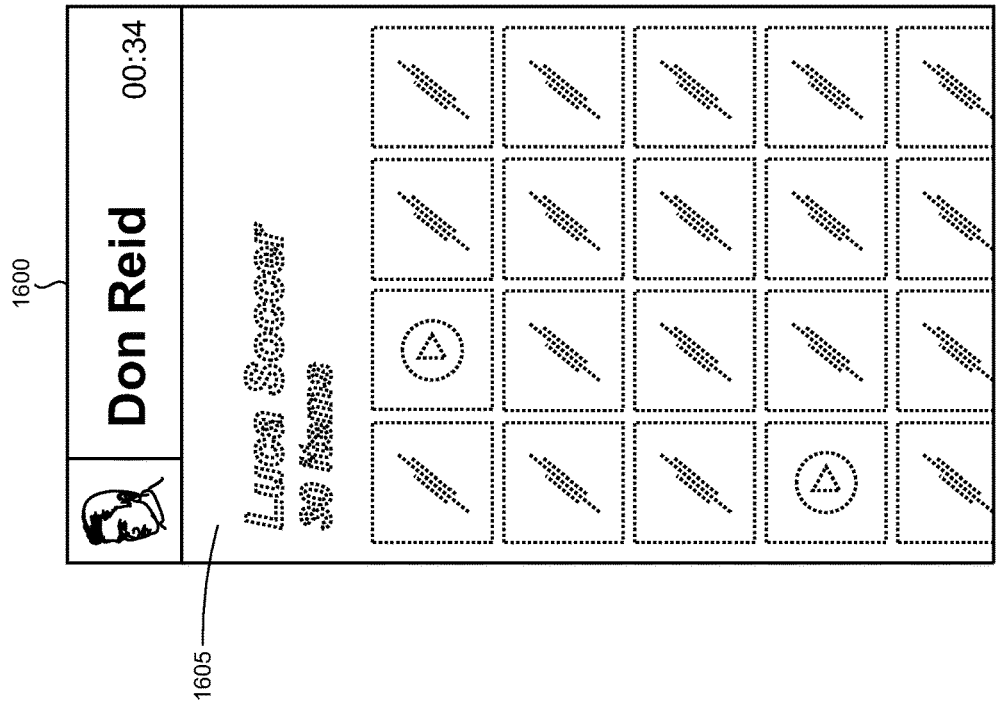
Figure 15:
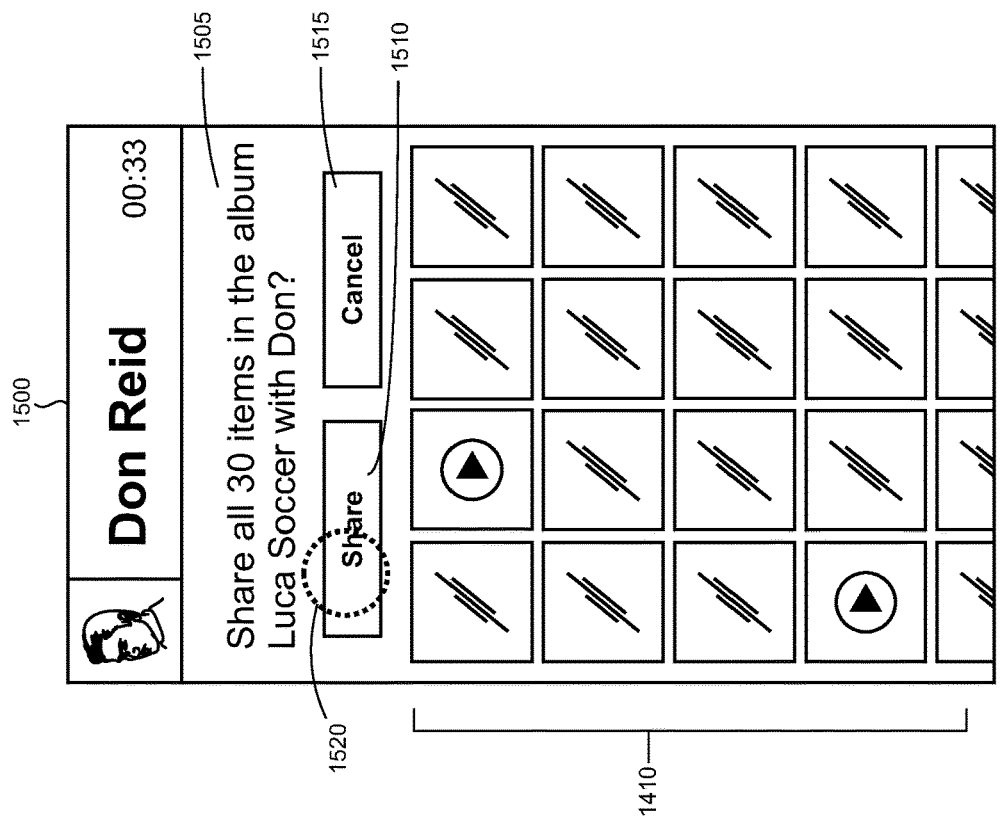

As shown in the UI 1400 in FIG. 14, in response to the user selection, the album opens as a vertically scrollable window 1405 displaying thumbnails 1410 of individual pieces of shareable content including both photos and videos (actual thumbnail images are not shown in FIG. 14 for sake of clarity in illustration). The user can select one or more pieces of content in the album for sharing, for example by touching the appropriate corresponding thumbnails 1410. In this example, the user does not select a particular subset of content and employs a touch 1415 on a sharing button 1420 to share all the content in the album. This action brings up the UI 1500 which exposes a text string confirmation 1505 and buttons 1510 and 1515 for respectively sharing the content or canceling. In this example, the user employs a touch 1520 to share all of the album's content with the remote party during the phone call.

At this point, the selected content is pre-staged for presentation to the remote user, but no content is shared with the remote party until the user is ready. As shown in the UI 1600 in FIG. 16, the sharing screen 1605 on the user's device is "grayed out" to indicate that none of the selected content is currently being shared with the remote party. When the user is ready to initiate a curated sharing experience, as shown in the UI 1700 in FIG. 17, a touch 1705 on content thumbnail 1710 lights up the sharing screen and that piece of selected content is shared with the remote user.

Figure 18:
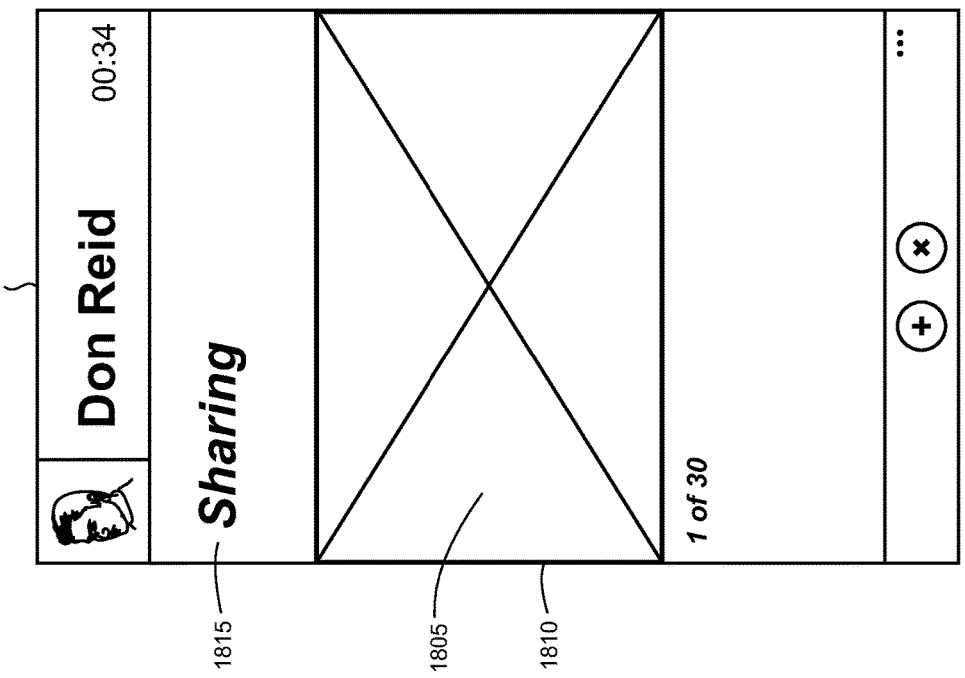
Figure 17:
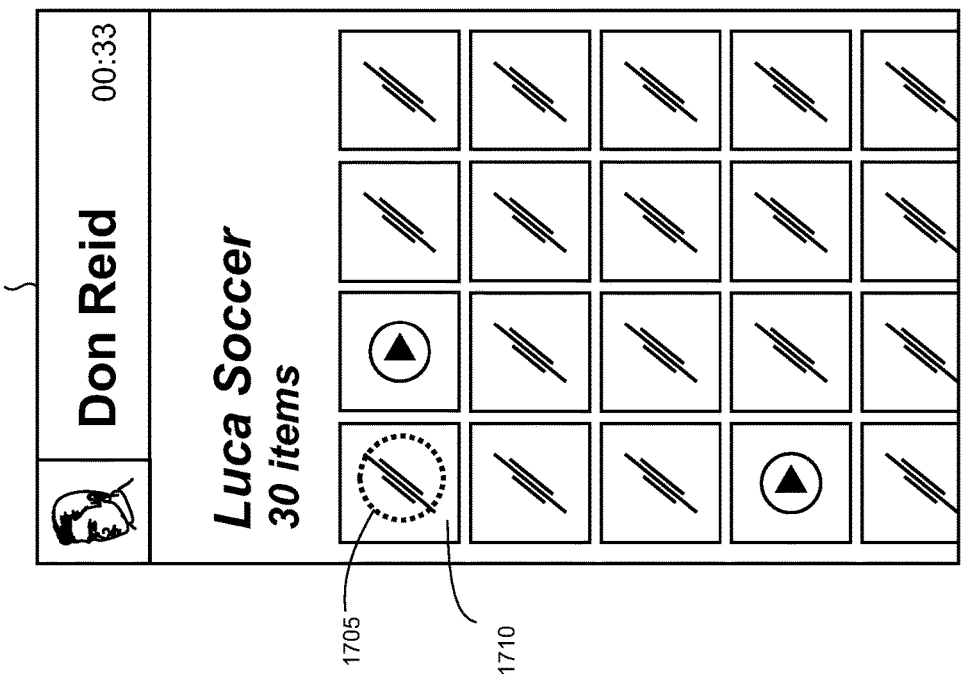
Figure 21:
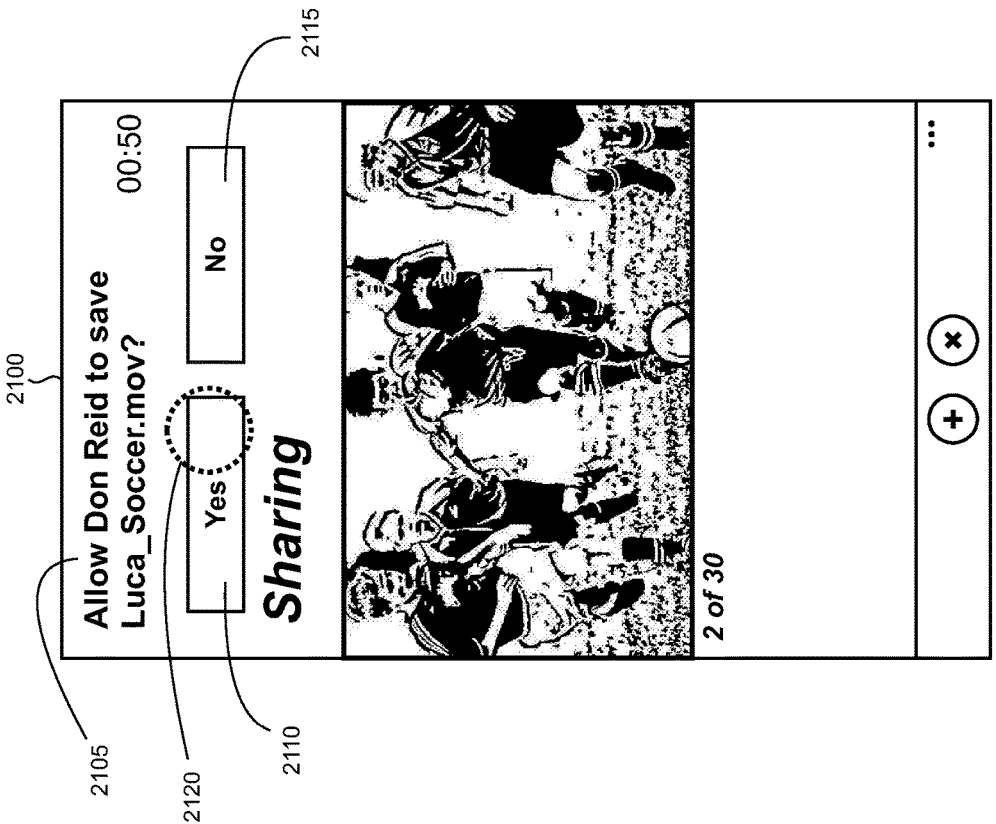
Figure 20:
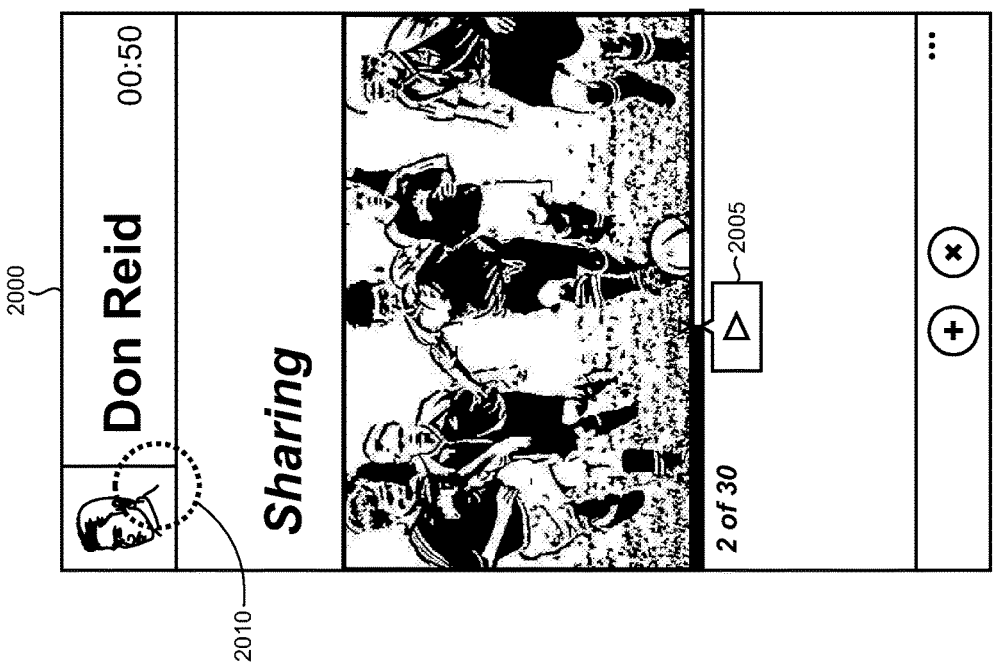

FIG. 18 shows UI 1800 which displays the currently shared content 1805 in a window 1810 on the UI along with a text string 1815 ("Sharing") to indicate to the user that the displayed content is being shared. The real-time sharing component 450 (FIG. 4) enables the user to exercise complete control over the pacing of the sharing. In this example, the UI is configured to enable the user to horizontally scroll the content shown in the display window 1810 when the user wishes to present another piece of content in the album to the remote user. As noted above, the user can continue to provide voice narration during the sharing. The user can also employ the various tools described in the text accompanying FIG. 9 to enhance the sharing experience. For example, the user may wish to use a tool that enables a particular sharing session to be named and then use other tools to put together a title page to a presentation of shared content. The user can also employ tools to produce animated closing "credits" that may include, for example, names of people that are tagged in shared photos and/or links to other content and/or experiences that may be contextually relevant to the shared content.

As shown in the succession of screen captures of UI 1900 in FIG. 19, the user 105 may use a touch and drag operation (as shown in the inset drawing 1902) to scroll to the next piece of content 1915 in the album (i.e., item 2 of 30) into the active sharing window 1910. In this example, the next piece of content is a 56 second video clip. The video clip can be started when the user presses the exposed play button 1920. As shown in the UI 2000 in FIG. 20, video transport controls 2005 can be exposed so that the user can scrub the video clip, pause, resume play, etc. as part of the curated real-time sharing session with the remote user during the phone call.

The real-time sharing component can surface various content control features. When the user employs a touch 2010 on the remote party's avatar or name, content control options are provided as illustratively shown in the UI 2100 in FIG. 21. Here, a text string 2105 is displayed on the UI which asks if the remote user can save the currently shared content to the remote user's device. Buttons 2110 and 2115 are displayed for respectively allowing or preventing such saving by the remote user. Here, the user employs touch 2120 to allow the remote user to save a copy of the currently shared content (i.e., the video clip).

Other content control options can also be exposed and utilized to meet the needs of a particular implementation. For example, shared content can be configured to be accessible for download by the remote party for a limited duration time period and/or during a user-specified time interval. In other implementations, the shared content can be arranged to be remotely viewed after the sharing session ends, but only for a limited time period and/or during a user-specified time interval. In some cases, the service provider 130 (FIG. 1) may be utilized as a host for the user's shared content to facilitate post-sharing session access by the remote party. The service provider can then enforce time limits and/or content controls on behalf of the user in such cases.

In some cases in which the user has elected to disable saving of shared content by the remote party, various methodologies may be employed to prevent the remote party from using screen capture features and/or utilities to work around such disablement. For example, screen capture features that are supported by the device's operating system may be disabled and/or overridden on the remote device in some implementations. In scenarios in which third party applications may be used at the remote device for screen captures, the displayed shared content can include various treatments that still enable the remote user to see the content, but make screen captures less attractive using, for example, watermarks and the like. Shared content can also be processed in some implementations using one or more of temporal dithering, manipulation of content refresh rate, scrambling, and/or encryption to disable saving of shared content at the remote device.

Figure 22:
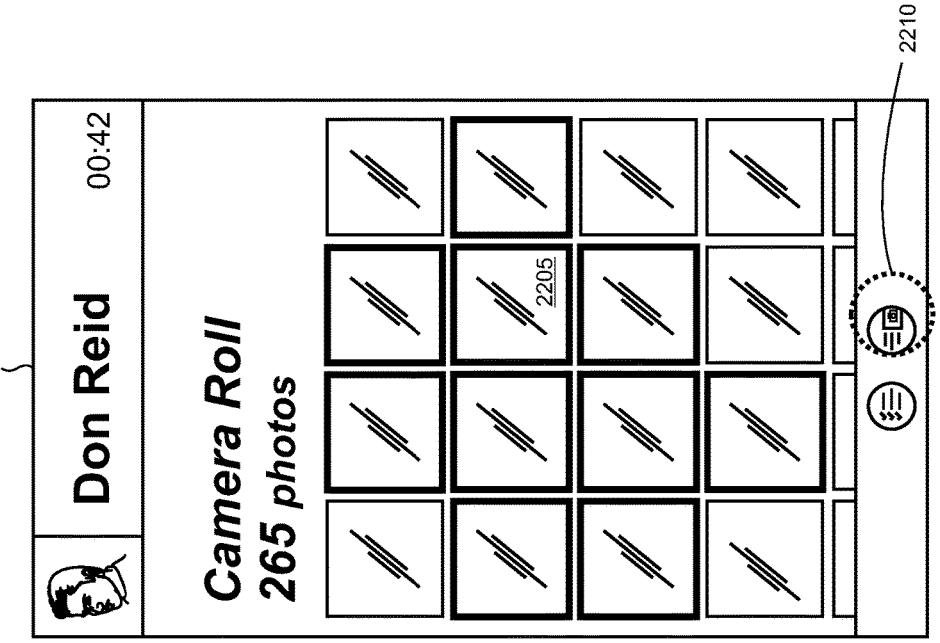

FIG. 22 shows a UI 2200 that illustrates another example of real-time sharing. In this example, the user has selected an album named "Camera Roll" that contains 265 pieces of content. Using multiple instances of touches on the device's touchscreen, the user has selected a subset 2205 of 10 photos which are highlighted on the UI. Enabling such selection of just a subset of an album for sharing facilitates privacy protection for the user who may wish to reserve some content from being shared while also enhancing the curated user experience by enabling contextually appropriate content to be shared. The user employs a touch 2210 to share the selected content with the remote party during the phone call.

Figure 23:
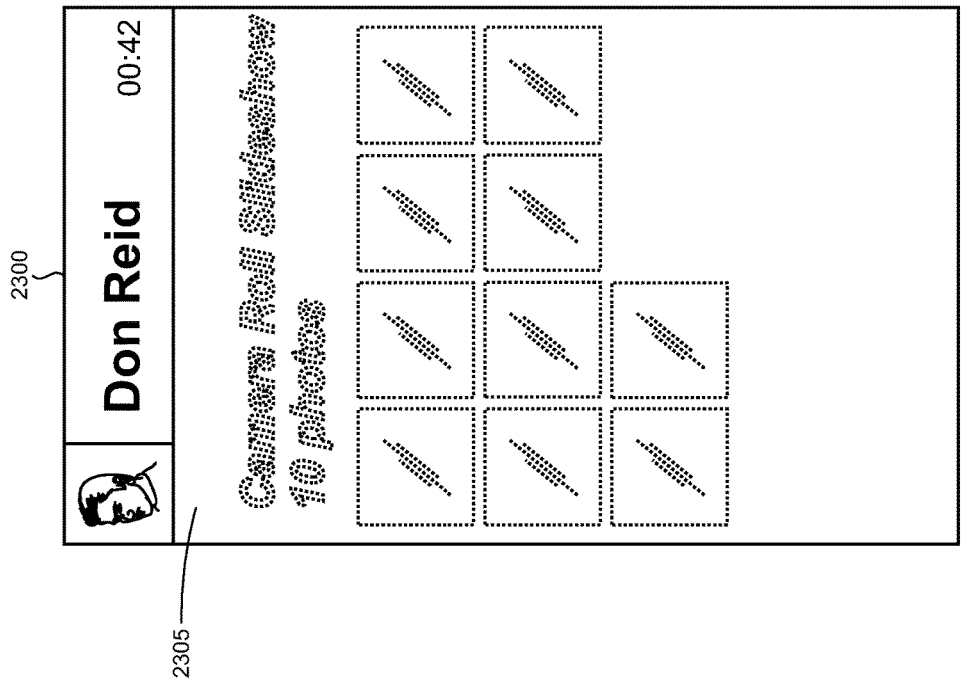

The selected content is pre-staged for presentation to the remote user as shown in the UI 2300 in FIG. 23. The sharing screen 2305 is again grayed out to indicate that none of the selected content (i.e., the 10 photos) is currently being shared with the remote user. When the user is ready to initiate a curated sharing experience, a touch on a content thumbnail lights up the sharing screen and that piece of selected content is shared with the remote user. As noted above, the local user is able to exercise full control over the pacing and presentation of the sharing. However, in some circumstances, the user can selectively give control over the presentation to the remote user. For example, the local user could be showing a sequence of photos about a car being sold at a nearby dealer and the remote user has a question or comment about a particular picture that was shown earlier. The local user can give temporary control to the remote user so that the remote user can go back to the picture of interest in the presentation instead of having to verbally describe to the local user how to navigate back to the picture of interest.

Figure 24:
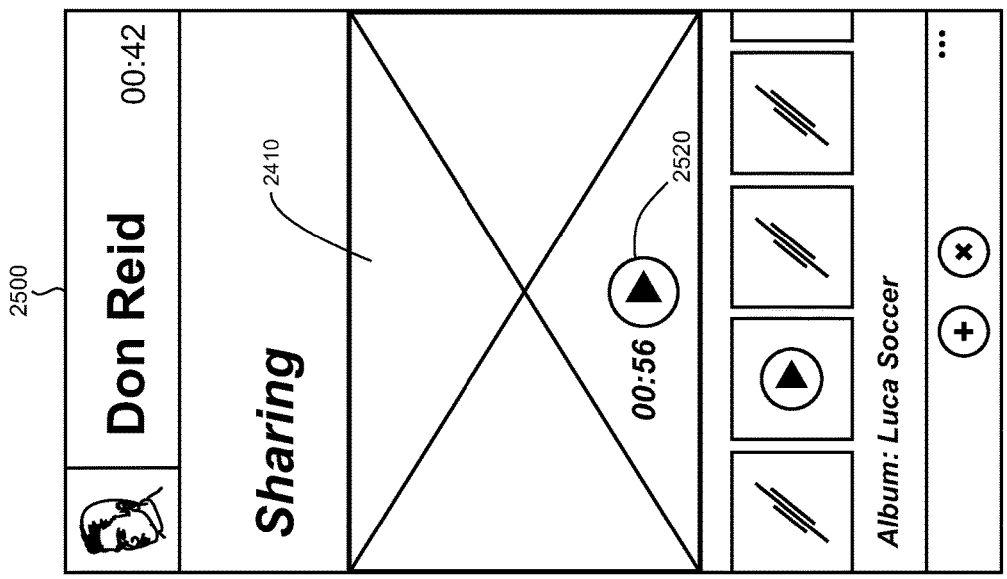
Figure 25:
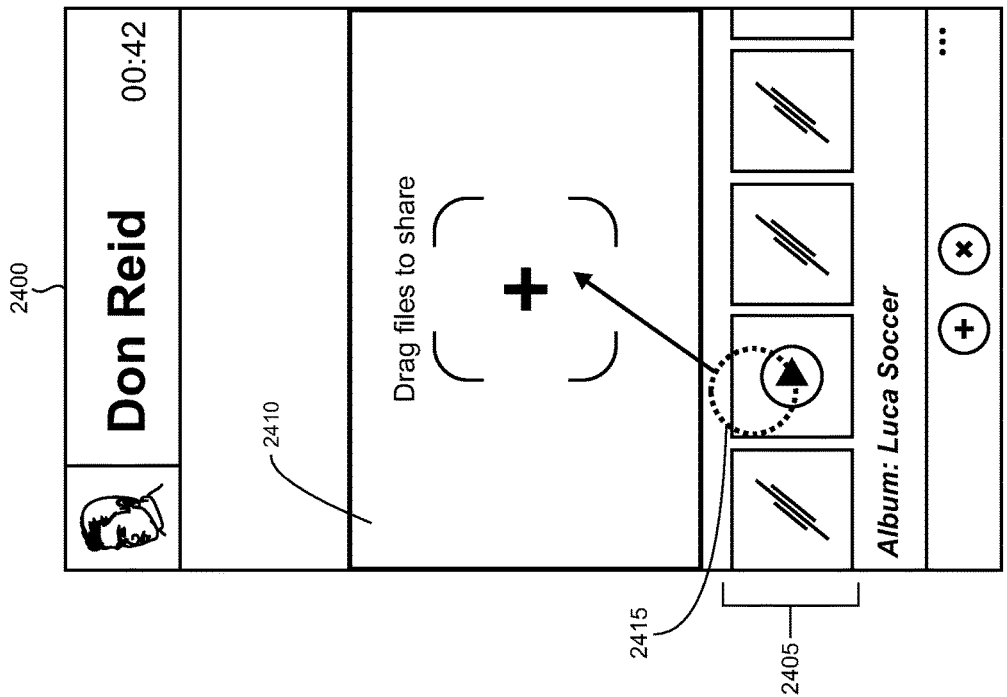

FIGS. 24 and 25 show an illustrative example of other UIs 2400 and 2500 that can be alternatively utilized during a phone call to facilitate the present real-time sharing. Here, content in a selected album is displayed as a filmstrip 2405 of horizontally scrollable thumbnails. An active sharing window 2410 is configured so that the user can drag selected content items from the filmstrip into the sharing window for sharing with the remote party. As shown, the user has employed a touch 2415 to select and drag a video clip into the sharing window 2410. The video clip can be started when the user presses the exposed play button 2520 as shown in FIG. 25.

Multiple content items can be dragged into the sharing window 2410 in some cases which will then be displayed during the real-time sharing session in the particular order in which they were dragged and placed into the window (for example, the user can horizontally scroll among content items during the real-time sharing session as shown above in FIG. 19 and described in the accompanying text). Alternatively, after sharing a particular piece of content, the user can return to the UI 2400 to select and drag another content item into the sharing window 2410 for real-time sharing. A given real-time sharing session is typically implemented in a manner than maintains context for the shared content. For example, videos play inline within shared content, a shared word processing document supports vertical scrolling, audio content includes embedded volume controls, and the like. Such context can be typically maintained on both the local and remote devices to the sharing session.

Figure 26:
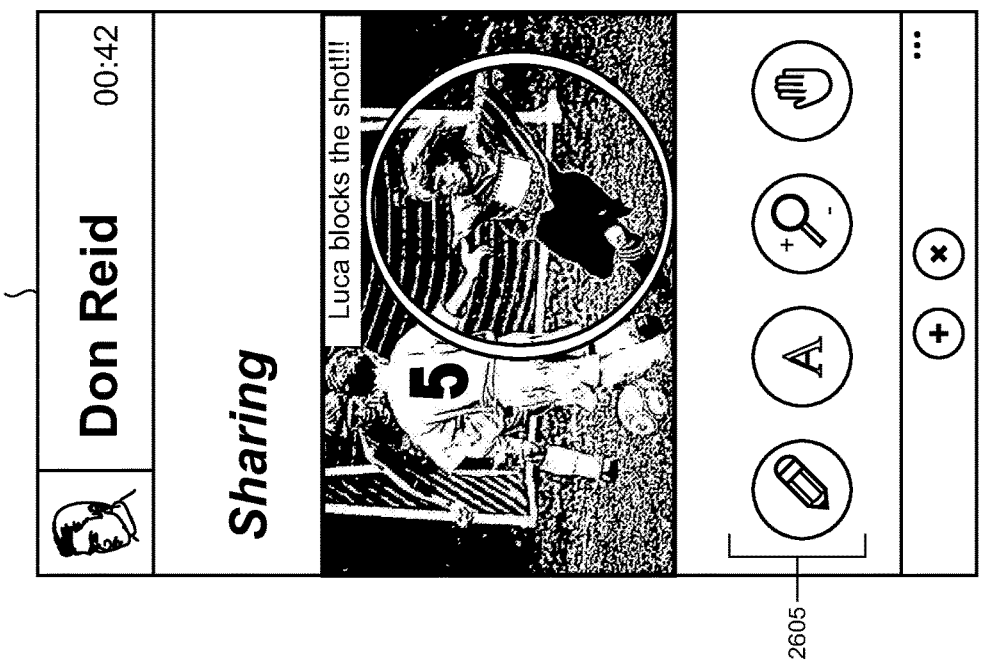

FIG. 26 shows an illustrative UI 2600 in which various tools 2605 are exposed to the user to add highlighting and annotations or comments to a shared content item and control the content presentation by zooming in and out and/or panning The particular tools exposed and the features provided can vary according to the needs of a particular implementation and not all the tools need to be supported in every implementation. Colors, shading, transparency, animation and other effects can also be supported in some cases. The drawing tools can also be arranged to be "smart" tools so that line smoothing is implemented and perfect shapes (i.e., circles, squares, etc.) are drawn. The degree of smoothing and shape perfection utilized can be user-selectable in some implementations.

Figure 27:
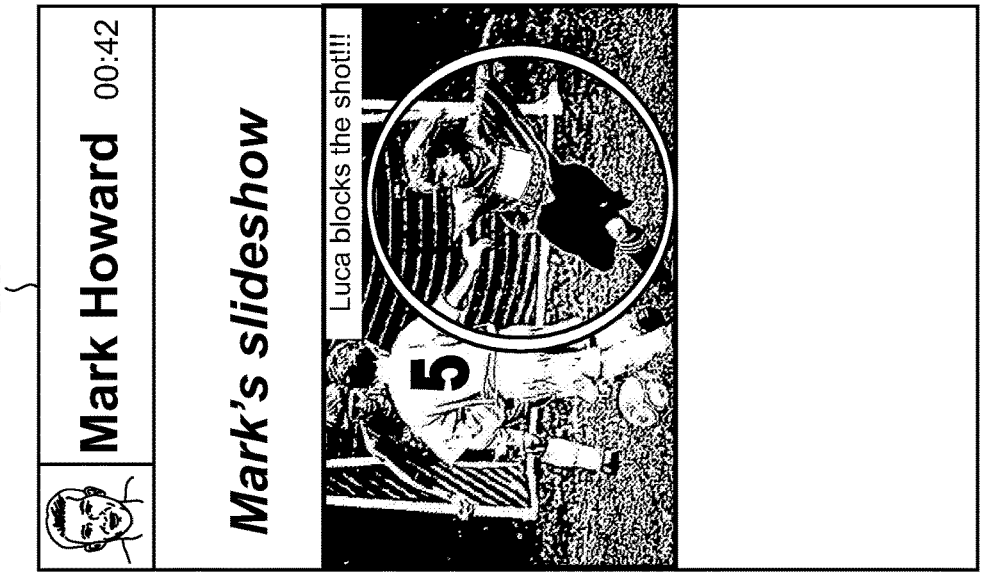

In this example, the user has used a pen tool to draw a highlighting circle around a particular portion of the displayed photo and added an annotation (i.e., a caption). The highlighting can be implemented live during the real-time sharing session or alternatively the user can employ the tools during presentation staging so that only the finished highlighted content item is shared. As shown in FIG. 27, the shared content item with the highlighting is displayed on a UI 2700 that is shown on the remote user's device.

Figure 28:
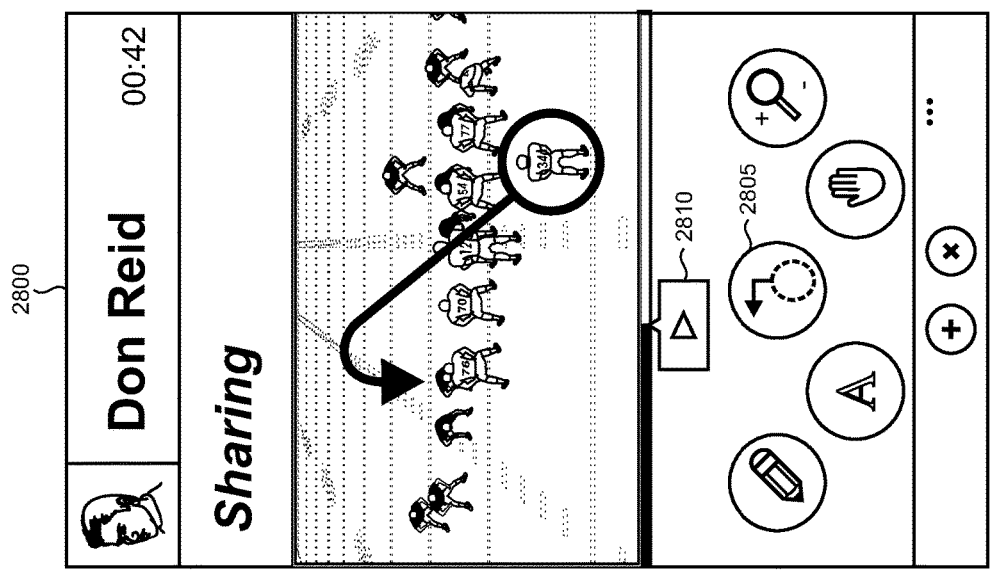

When the shared content is a video, the highlighting toolkit can be expanded to include additional tools such as a telestration tool 2805 shown in the UI 2800 in FIG. 28. The telestration tool 2805 can expose a variety of telestrating functionalities so that the user can mark up and highlight portions of the video in a real-time sharing session using lines and shapes of various colors while the video is paused in a similar manner, for example, as is performed on broadcasts of professional sporting events. A video transport control 2810 is provided so that the user can play, pause, and scrub the video as desired.

Figure 30:
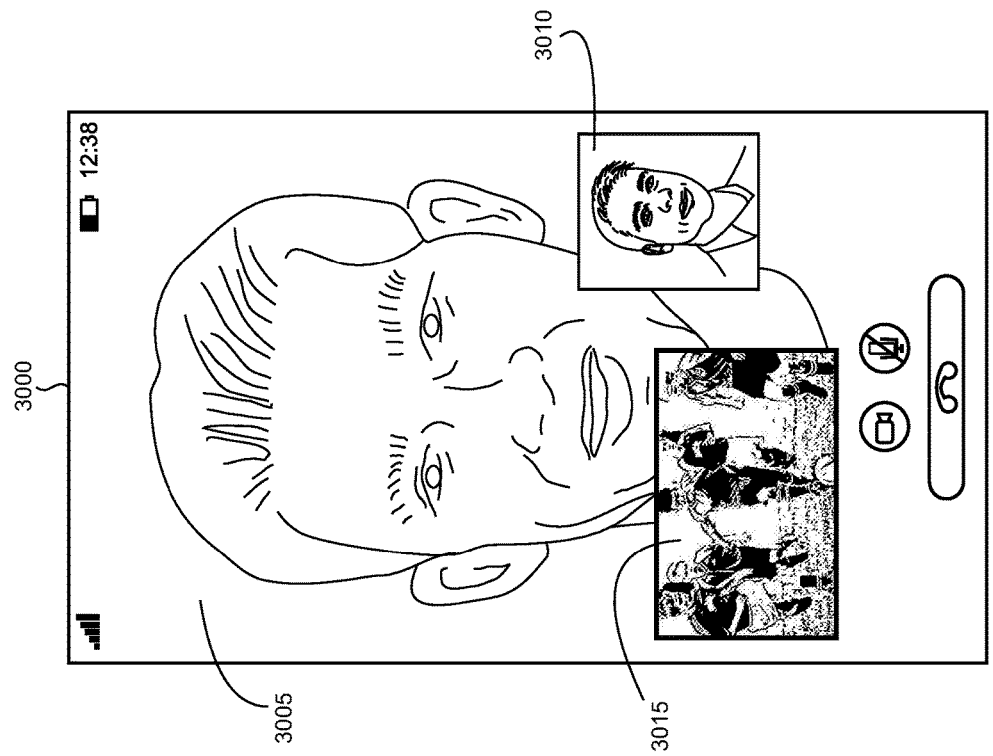
Figure 29:
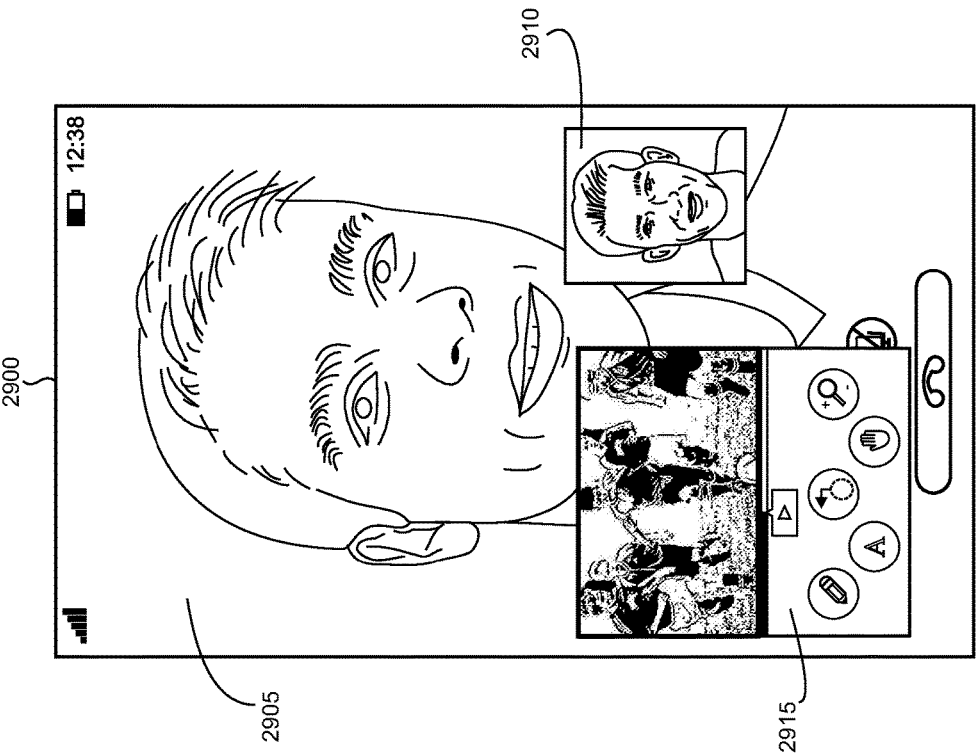

While the illustrative examples of real-time sharing above are described in the context of a voice call, real-time sharing can also be implemented in the context of a video call. As shown in FIGS. 29 and 30, the UIs 2900 and 3000 exposed by a video calling app (e.g., app 445 in FIG. 4) provide a relatively large canvas into which shared content can be placed for display. In FIG. 29, the UI 2900 on the user's device (i.e., the local sharing party) can be arranged to display the video image of the remote party in large view 2905, a small inset view 2910 of the user, and an active sharing window 2915 that shows the shared content along with presentation tools and other presentation preparation UIs, as appropriate.

In some implementations, the sharing window 2915 can be placed in a particular position on the UI 2900 by the user and/or enlarged or reduced in size. For example, the user can touch and drag the sharing window 2915 into a desired location and enlarge and shrink the window using multi-touch gestures such as pinching and spreading.

In FIG. 30, the UI 3000 is displayed on the remote party's device. In a similar manner as with the UI 2900 on the user's device, the remote party UI 3000 includes a large view 3005 of the other party (i.e., the local sharing party), an inset view 3010, and a sharing window 3015. Here, the sharing window 3015 shows the shared content provided by the local sharing party and therefore does not expose any content preparation/presentation UIs or pre-staged content. In some implementations, the sharing window 3015 on the remote party's device can be user-positioned and sized on the UI.

Figure 31:
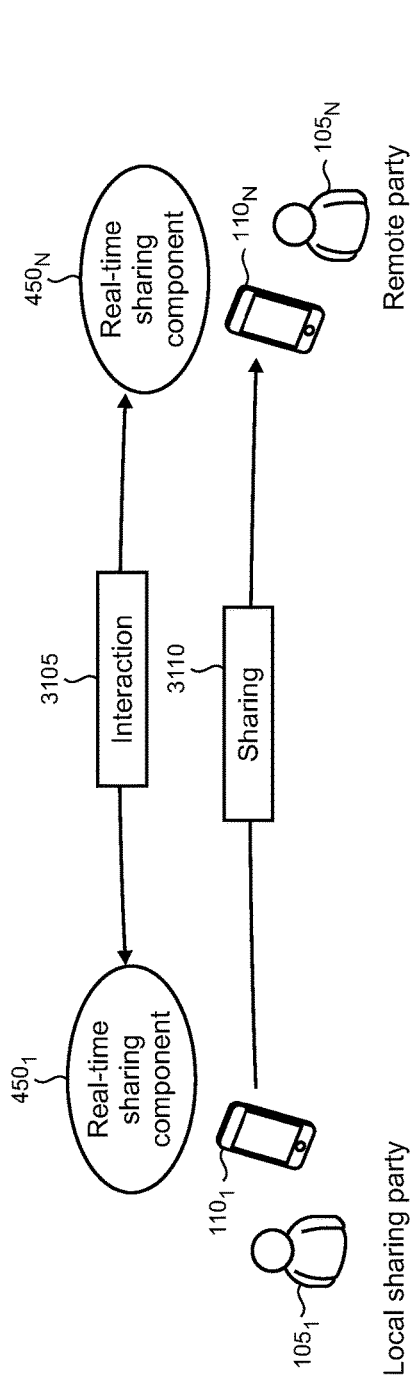
FIG. 31 shows illustrative interaction between real-time sharing components that are instantiated on respective devices.

In some real-time sharing scenarios, each of the devices participating in the sharing (whether single instances of sharing or multi-instance sharing among two or more parties) can have a real-time sharing component installed and executing to support the real-time sharing user experience. This is shown in FIG. 31 in which interaction (indicated by reference numeral 3105) typically occurs between individual instances of a real-time sharing component 450 on each of the devices 110 to facilitate sharing 3110.

Figure 32:
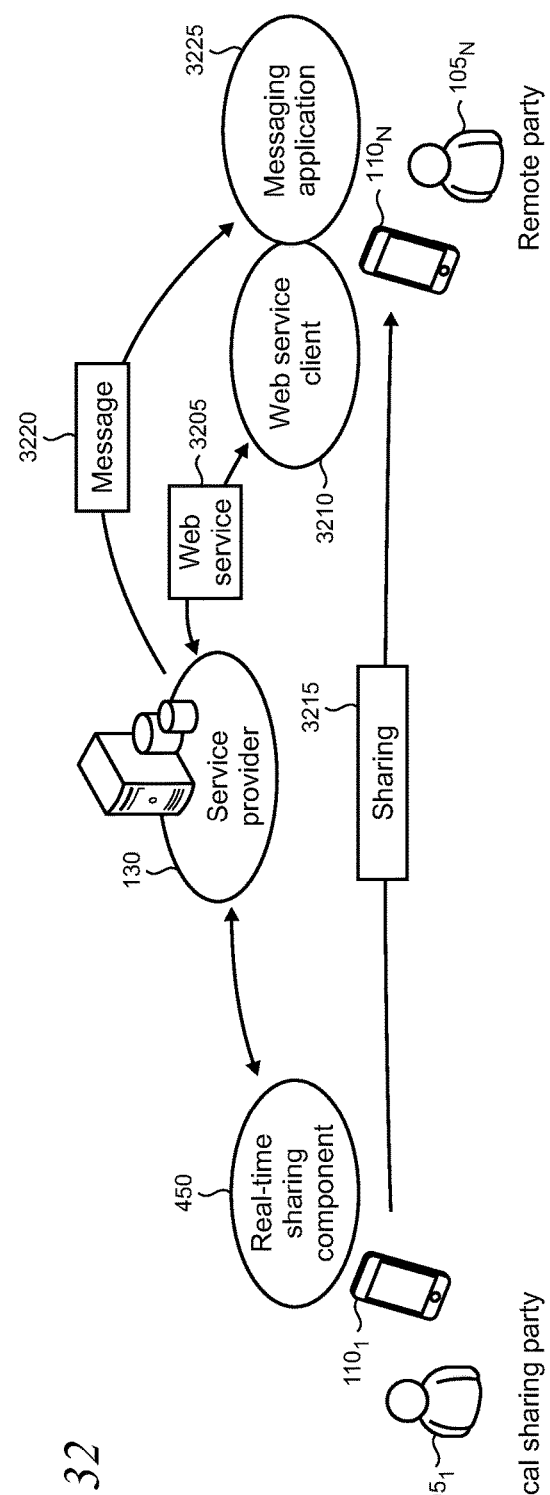
FIG. 32 shows illustrative interactions between a real-time sharing component on one device, a remote service provider, and client components on another device.

In other real-time sharing scenarios, one or more of the parties participating in the sharing may not have a real-time sharing component 450 instantiated. In such cases, real-time sharing may still be implemented with a full set of features and user experiences by leveraging capabilities provided by the remote service provider 130 as shown in FIG. 32. The service provider 130 can provide a web service 3205 to a web service client 3210 such as a browser or other application on the remote device so that shared content from the local real-time sharing component 450 can be furnished by the service provider to the client for rendering during sharing 3215.

When the local sharing party initiates a sharing session, the service provider 130 can send a message 3220 to a messaging application 3225 that is available on the remote device. For example, the message 3220 can be a text message that is transported using SMS (Short Message Service) that contains a link to the shared content and a real-time curated sharing experience that is facilitated by the web service 3205.

Figure 33:
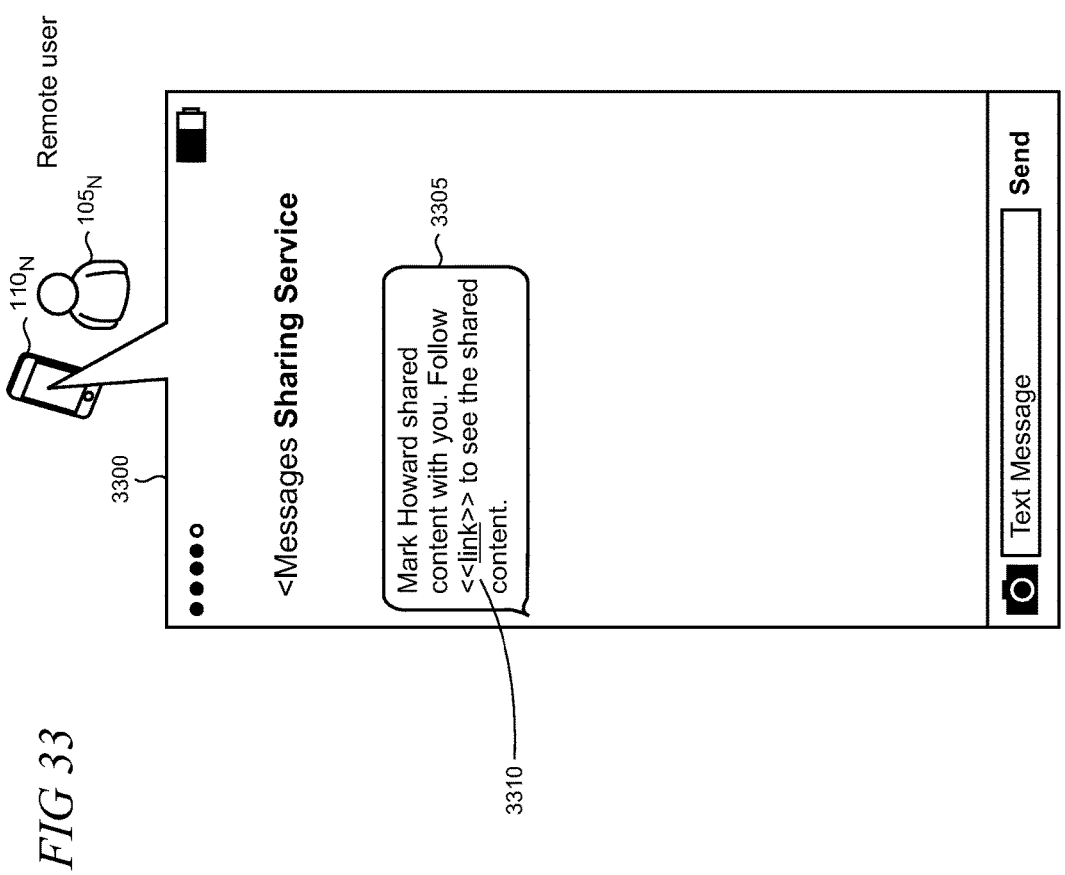
FIG. 33 shows a screen capture of an illustrative UI exposed by a device that provides a link to shared content.

When the message 3220 is received by the messaging application 3225 it can typically surface the message in a UI, for example UI 3300 shown in FIG. 33. In this example, the message sender is identified as "Sharing Service" and the displayed message 3305 includes a brief message that typically identifies the local sharing party by name and includes a link 3310 that the remote party can follow to participate in the curated real-time sharing session.

Figure 34:
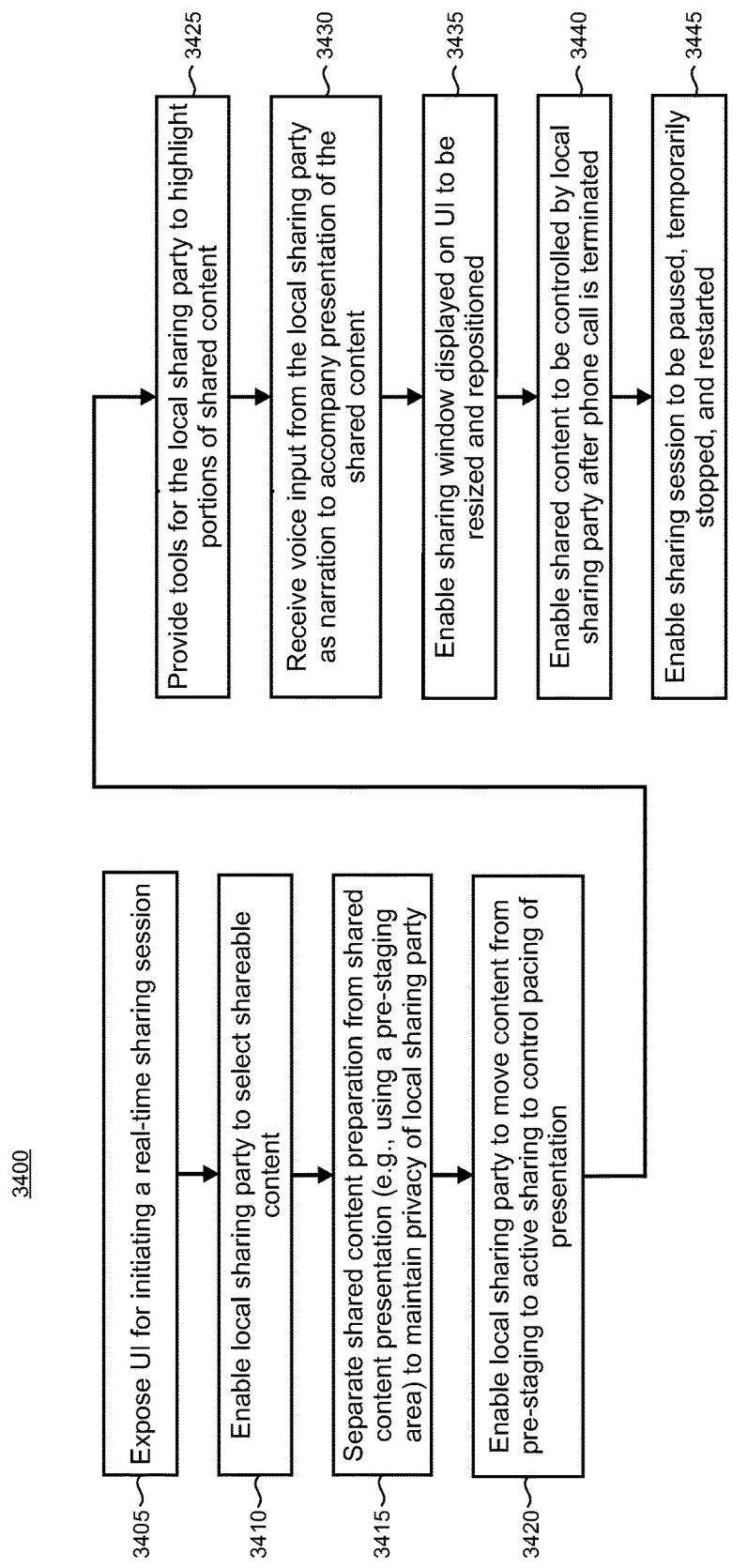
FIGS. 34 and 35 show illustrative methods that may be performed when implementing the present real-time sharing during a phone call.

FIG. 34 shows a flowchart of an illustrative method 3400 for implementing real-time sharing. Unless specifically stated, the methods or steps shown in the flowcharts below and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 3405, a UI is exposed for the local sharing party to initiate real-time sharing with the remote party. As noted above, the UI may be incorporated into the UI exposed by a voice calling application or video calling application. In step 3410, the local sharing party is enabled to select among available content for sharing. In step 3415, preparation for sharing is kept separate from the active sharing window so that the local sharing party's privacy is maintained. That is, the remote party only sees the shared content that is placed in the active sharing window but not any of the local sharing party's activities that are occurring behind the scenes. For example, pre-staged content is not shown, nor are any tools exposed by the real-time sharing application for controlling, preparing, shaping, or modifying the shared contents and their presentation.

In step 3420, enablement is provided to the local sharing party to move content from pre-staging to active sharing so as to control pacing of the presentation of shared content. Such movement can be accomplished in a variety of ways as described above including horizontal scrolling among content items in the active sharing window, moving items from a filmstrip to the active sharing window, etc.

In step 3425, tools are provided for highlighting the shared content. The highlighting can typically be performed before the content is shared while being pre-staged, or the highlighting can be performed on the content while actually shared, so that the remote party can see the highlighting being added in real-time as it occurs. Highlighting can be implemented using one or more of lines, graphic shapes, graphic objects, text, colors, transparency, shading or animation, and/or combinations thereof. In step 3430, voice inputs are received from the local sharing party that form a narration that accompanies the presentation of the shared content. In step 3435, enablement is provided to reposition and resize the sharing window on the UI. In step 3440, enablement is provided for shared content to be controlled after the phone call is terminated. Such content control arrangement may be referred to as a "leave behind" or souvenir in which the local sharing party is provided with options by the real-time sharing component to control whether the shared content can be saved by the remote party, access the shared content post-call, view the shared content as a stream without saving, etc. An exemplary leave behind could include, for example, a video file of the sharing session including the shared content and narration provided during the phone call.

In step 3445, enablement is provided for a given sharing session to be paused, temporarily stopped, and then restarted. For example, sharing could be paused during a phone and then resumed later in that same call. Alternatively, sharing might be stopped altogether and then picked up again (e.g., from the beginning or from where the sharing left off) in a separate call later. Sharing session data can be persisted in both cases to enable the user to readily restart the sharing experience. In some cases such sharing session data can also be utilized so that the user can give the same presentation to different remote users at different times on different calls.

Figure 35:
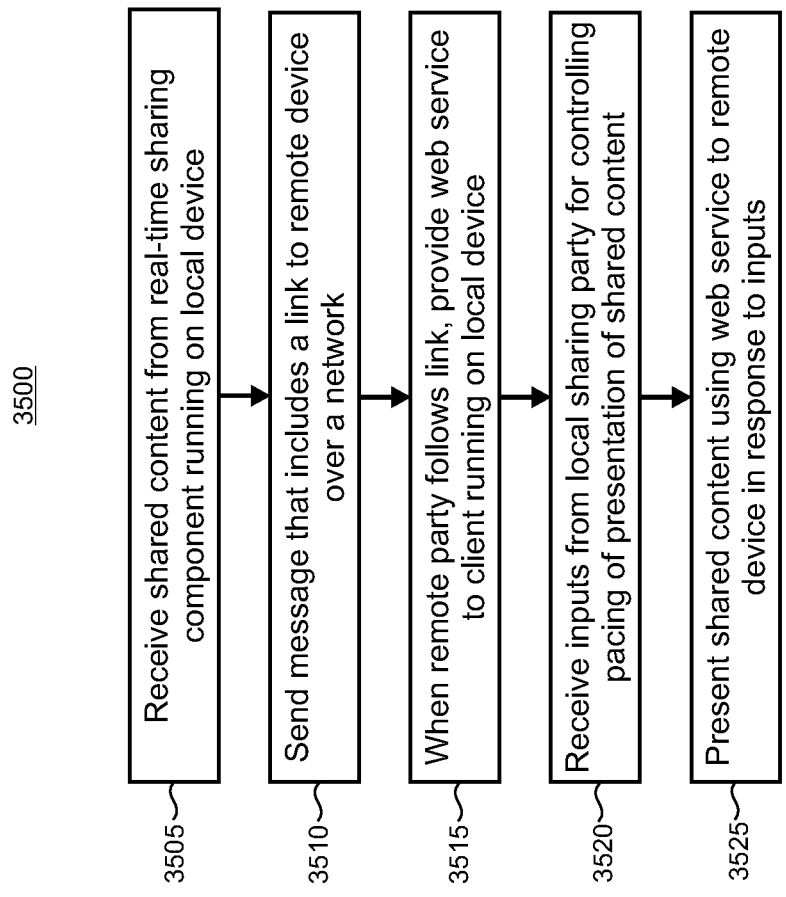

FIG. 35 shows a flowchart of an illustrative method 3500 for facilitating real-time sharing using a web service supported by a service provider (e.g., service provider 130 in FIG. 1). In step 3505, shared content is received from a real-time sharing component that is operating on a local device. In some cases, shared content is not received, but initiation of a real-time sharing session is otherwise indicated to the service provider. In response in step 3510, the service provider sends a message over a network to a remote device that includes a link that can be followed to access a real-time sharing experience. For example, the message can be a text message that is sent over SMS.

In step 3515, when the remote party follows the link, a web service is provided to a client that runs on the remote device. The web service can then render the real-time sharing experience into the web service client such as a browser or other application. In step 3520, inputs are received for controlling the pacing of the shared content presentation. The web service will present the shared content responsively to the inputs in step 3525.

Figure 36:
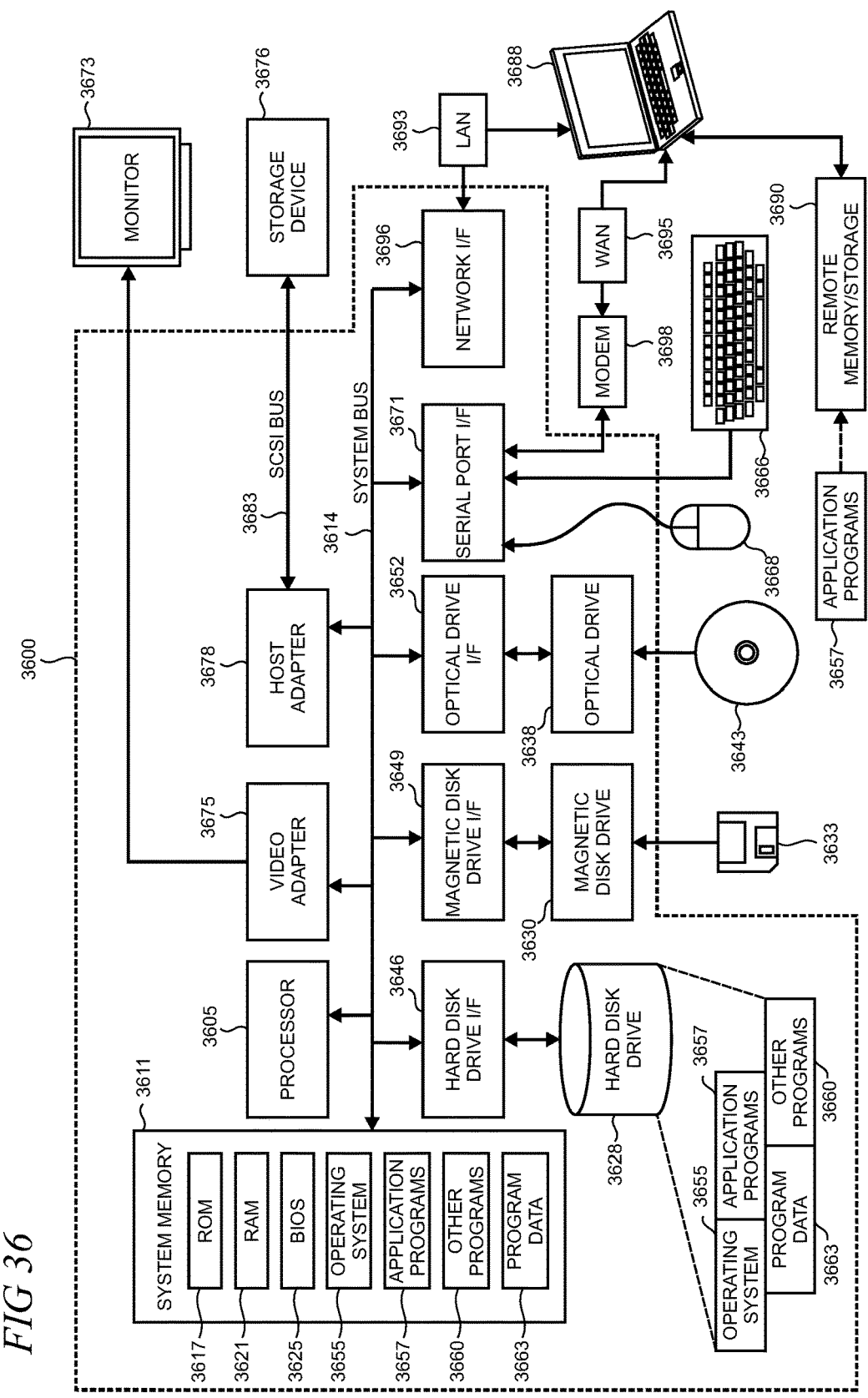
FIG. 36 is a simplified block diagram of an illustrative computer system such as a personal computer (PC) that may be used in part to implement the present real-time sharing during a phone call.

FIG. 36 is a simplified block diagram of an illustrative computer system 3600 such as a PC, client machine, or server with which the present real-time sharing during a phone call may be implemented. Computer system 3600 includes a processor 3605, a system memory 3611, and a system bus 3614 that couples various system components including the system memory 3611 to the processor 3605. The system bus 3614 may be any of several types of bus structures including a memory bus or memory controller, a peripheral bus, or a local bus using any of a variety of bus architectures. The system memory 3611 includes read only memory (ROM) 3617 and random access memory (RAM) 3621. A basic input/output system (BIOS) 3625, containing the basic routines that help to transfer information between elements within the computer system 3600, such as during startup, is stored in ROM 3617. The computer system 3600 may further include a hard disk drive 3628 for reading from and writing to an internally disposed hard disk (not shown), a magnetic disk drive 3630 for reading from or writing to a removable magnetic disk 3633 (e.g., a floppy disk), and an optical disk drive 3638 for reading from or writing to a removable optical disk 3643 such as a CD (compact disc), DVD (digital versatile disc), or other optical media. The hard disk drive 3628, magnetic disk drive 3630, and optical disk drive 3638 are connected to the system bus 3614 by a hard disk drive interface 3646, a magnetic disk drive interface 3649, and an optical drive interface 3652, respectively. The drives and their associated computer-readable storage media provide non-volatile storage of computer-readable instructions, data structures, program modules, and other data for the computer system 3600. Although this illustrative example includes a hard disk, a removable magnetic disk 3633, and a removable optical disk 3643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present real-time sharing during a phone call. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 3633, optical disk 3643, ROM 3617, or RAM 3621, including an operating system 3655, one or more application programs 3657, other program modules 3660, and program data 3663. A user may enter commands and information into the computer system 3600 through input devices such as a keyboard 3666 and pointing device 3668 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 3605 through a serial port interface 3671 that is coupled to the system bus 3614, but may be connected by other interfaces, such as a parallel port, game port, or universal serial bus (USB). A monitor 3673 or other type of display device is also connected to the system bus 3614 via an interface, such as a video adapter 3675. In addition to the monitor 3673, personal computers typically include other peripheral output devices (not shown), such as speakers and printers. The illustrative example shown in FIG. 36 also includes a host adapter 3678, a Small Computer System Interface (SCSI) bus 3683, and an external storage device 3676 connected to the SCSI bus 3683.

The computer system 3600 is operable in a networked environment using logical connections to one or more remote computers, such as a remote computer 3688. The remote computer 3688 may be selected as another personal computer, a server, a router, a network PC, a peer device, or other common network node, and typically includes many or all of the elements described above relative to the computer system 3600, although only a single representative remote memory/storage device 3690 is shown in FIG. 36. The logical connections depicted in FIG. 36 include a local area network (LAN) 3693 and a wide area network (WAN) 3695. Such networking environments are often deployed, for example, in offices, enterprise-wide computer networks, intranets, and the Internet.

When used in a LAN networking environment, the computer system 3600 is connected to the local area network 3693 through a network interface or adapter 3696. When used in a WAN networking environment, the computer system 3600 typically includes a broadband modem 3698, network gateway, or other means for establishing communications over the wide area network 3695, such as the Internet. The broadband modem 3698, which may be internal or external, is connected to the system bus 3614 via a serial port interface 3671. In a networked environment, program modules related to the computer system 3600, or portions thereof, may be stored in the remote memory storage device 3690. It is noted that the network connections shown in FIG. 36 are illustrative and other means of establishing a communications link between the computers may be used depending on the specific requirements of an application of the present real-time sharing during a phone call.

Figure 37:
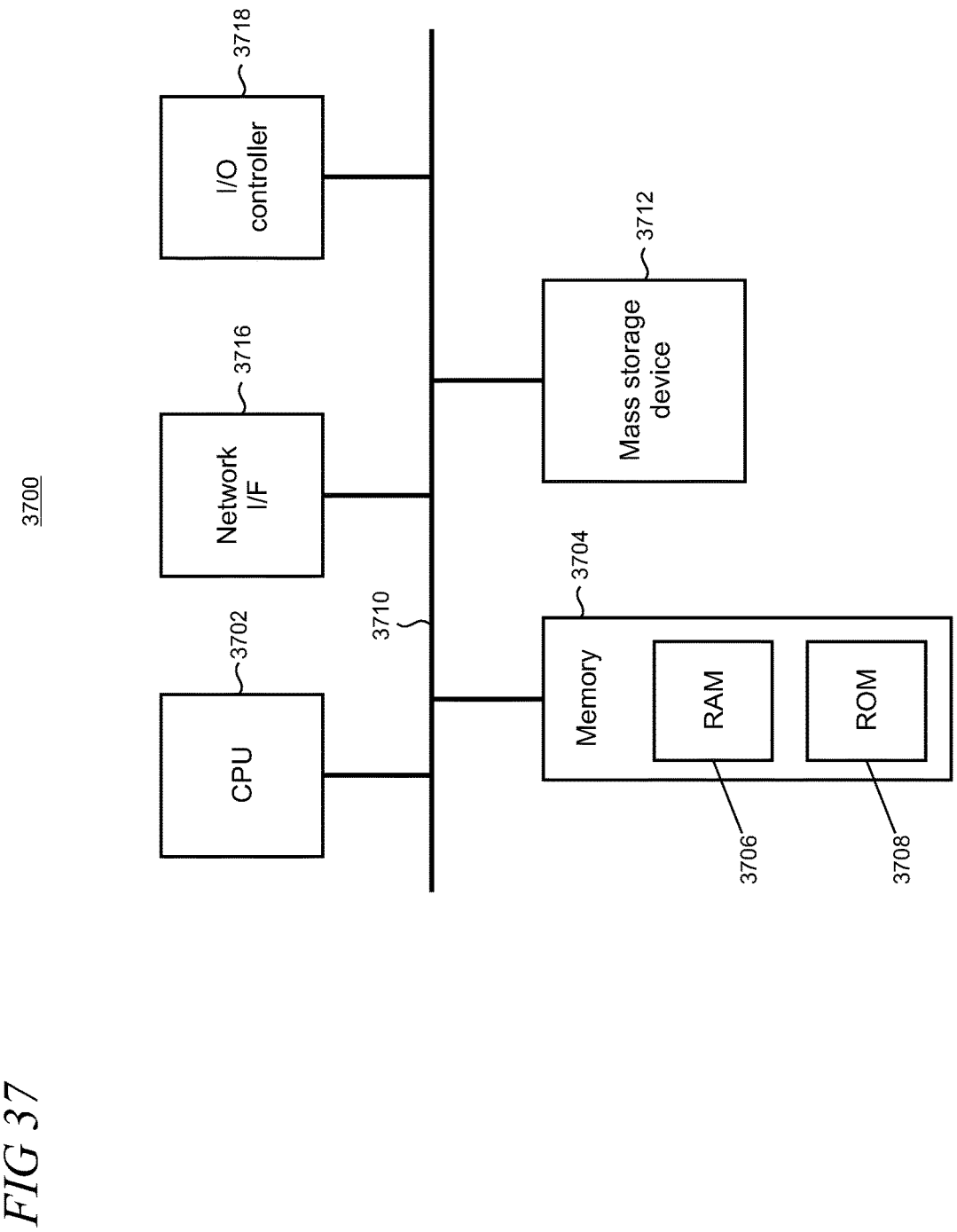
FIG. 37 shows a block diagram of an illustrative device that may be used in part to implement the present real-time sharing during a phone call.

FIG. 37 shows an illustrative architecture 3700 for a device capable of executing the various components described herein for providing the present real-timing sharing during a phone call. Thus, the architecture 3700 illustrated in FIG. 37 shows an architecture that may be adapted for a server computer, mobile phone, a PDA, a smartphone, a desktop computer, a netbook computer, a tablet computer, GPS device, gaming console, and/or a laptop computer. The architecture 3700 may be utilized to execute any aspect of the components presented herein.

The architecture 3700 illustrated in FIG. 37 includes a CPU (Central Processing Unit) 3702, a system memory 3704, including a RAM 3706 and a ROM 3708, and a system bus 3710 that couples the memory 3704 to the CPU 3702. A basic input/output system containing the basic routines that help to transfer information between elements within the architecture 3700, such as during startup, is stored in the ROM 3708. The architecture 3700 further includes a mass storage device 3712 for storing software code or other computer-executed code that is utilized to implement applications, the file system, and the operating system.

The mass storage device 3712 is connected to the CPU 3702 through a mass storage controller (not shown) connected to the bus 3710.The mass storage device 3712 and its associated computer-readable storage media provide non-volatile storage for the architecture 3700.

Although the description of computer-readable storage media contained herein refers to a mass storage device, such as a hard disk or CD-ROM drive, it may be appreciated by those skilled in the art that computer-readable storage media can be any available storage media that can be accessed by the architecture 3700.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3700.

According to various embodiments, the architecture 3700 may operate in a networked environment using logical connections to remote computers through a network. The architecture 3700 may connect to the network through a network interface unit 3716 connected to the bus 3710. It may be appreciated that the network interface unit 3716 also may be utilized to connect to other types of networks and remote computer systems. The architecture 3700 also may include an input/output controller 3718 for receiving and processing input from a number of other devices, including a keyboard, mouse, or electronic stylus (not shown in FIG. 37). Similarly, the input/output controller 3718 may provide output to a display screen, a printer, or other type of output device (also not shown in FIG. 37).

It may be appreciated that the software components described herein may, when loaded into the CPU 3702 and executed, transform the CPU 3702 and the overall architecture 3700 from a general-purpose computing system into a special-purpose computing system customized to facilitate the functionality presented herein. The CPU 3702 may be constructed from any number of transistors or other discrete circuit elements, which may individually or collectively assume any number of states. More specifically, the CPU 3702 may operate as a finite-state machine, in response to executable instructions contained within the software modules disclosed herein. These computer-executable instructions may transform the CPU 3702 by specifying how the CPU 3702 transitions between states, thereby transforming the transistors or other discrete hardware elements constituting the CPU 3702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3700 in order to store and execute the software components presented herein. It may also be appreciated that the architecture 3700 may include other types of computing devices, including handheld computers, embedded computer systems, smartphones, PDAs, and other types of computing devices known to those skilled in the art. It is also contemplated that the architecture 3700 may not include all of the components shown in FIG. 37, may include other components that are not explicitly shown in FIG. 37, or may utilize an architecture completely different from that shown in FIG. 37.

Figure 38:
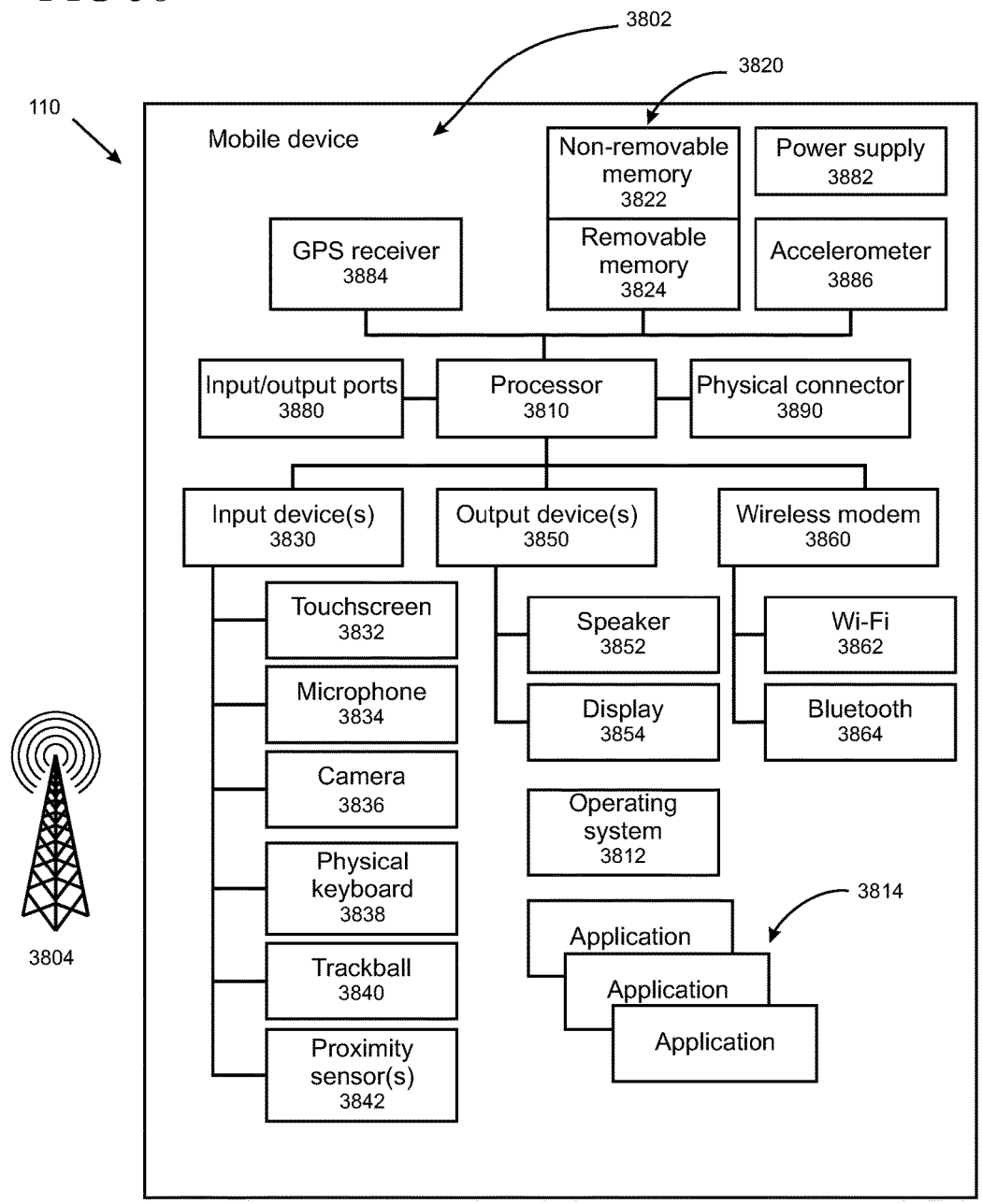
FIG. 38 is a block diagram of an illustrative mobile device.

FIG. 38 is a functional block diagram of an illustrative mobile device 110 such as a mobile phone or smartphone including a variety of optional hardware and software components, shown generally at 3802. Any component 3802 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 3804, such as a cellular or satellite network.

The illustrated device 110 can include a controller or processor 3810 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 3812 can control the allocation and usage of the components 3802, including power states, above-lock states, and below-lock states, and provides support for one or more application programs 3814. The application programs can include common mobile computing applications (e.g., image-capture applications, email applications, calendars, contact managers, web browsers, messaging applications), or any other computing application.

The illustrated mobile device 110 can include memory 3820. Memory 3820 can include non-removable memory 3822 and/or removable memory 3824. The non-removable memory 3822 can include RAM, ROM, Flash memory, a hard disk, or other well-known memory storage technologies. The removable memory 3824 can include Flash memory or a Subscriber Identity Module (SIM) card, which is well known in GSM (Global System for Mobile communications) systems, or other well-known memory storage technologies, such as "smart cards." The memory 3820 can be used for storing data and/or code for running the operating system 3812 and the application programs 3814. Example data can include web pages, text, images, sound files, video data, or other data sets to be sent to and/or received from one or more network servers or other devices via one or more wired or wireless networks.

The memory 3820 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 3820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 3830; such as a touch screen 3832; microphone 3834 for implementation of voice input for voice recognition, voice commands and the like; camera 3836; physical keyboard 3838; trackball 3840; and/or proximity sensor 3842; and one or more output devices 3850, such as a speaker 3852 and one or more displays 3854. Other input devices (not shown) using gesture recognition may also be utilized in some cases. Other possible output devices (not shown) can include piezoelectric or haptic output devices. Some devices can serve more than one input/output function. For example, touchscreen 3832 and display 3854 can be combined into a single input/output device.

A wireless modem 3860 can be coupled to an antenna (not shown) and can support two-way communications between the processor 3810 and external devices, as is well understood in the art. The modem 3860 is shown generically and can include a cellular modem for communicating with the mobile communication network 3804 and/or other radio-based modems (e.g., Bluetooth 3864 or Wi-Fi 3862). The wireless modem 3860 is typically configured for communication with one or more cellular networks, such as a GSM network for data and voice communications within a single cellular network, between cellular networks, or between the mobile device and a public switched telephone network (PSTN).

The mobile device can further include at least one input/output port 3880, a power supply 3882, a satellite navigation system receiver 3884, such as a GPS receiver, an accelerometer 3886, a gyroscope (not shown), and/or a physical connector 3890, which can be a USB port, IEEE 1394 (FireWire) port, and/or an RS-232 port. The illustrated components 3802 are not required or all-inclusive, as any components can be deleted and other components can be added.

Figure 39:
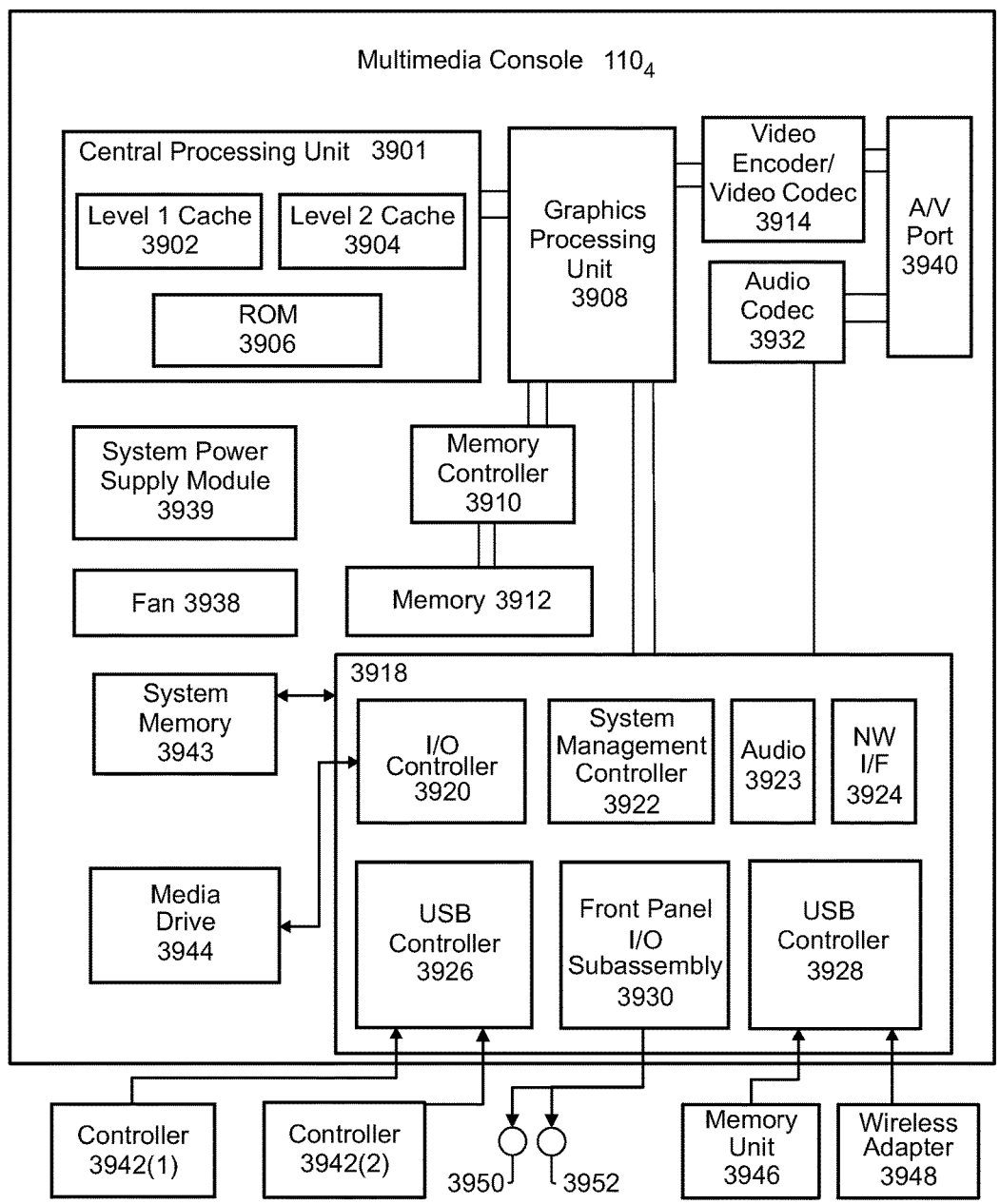
FIG. 39 is a block diagram of an illustrative multimedia console.

FIG. 39 is an illustrative functional block diagram of a multimedia console $110_4$. The multimedia console $110_4$ has a central processing unit (CPU) 3901 having a level 1 cache 3902, a level 2 cache 3904, and a Flash ROM (Read Only Memory) 3906. The level 1 cache 3902 and the level 2 cache 3904 temporarily store data and hence reduce the number of memory access cycles, thereby improving processing speed and throughput. The CPU 3901 may be configured with more than one core, and thus, additional level 1 and level 2 caches 3902 and 3904. The Flash ROM 3906 may store executable code that is loaded during an initial phase of a boot process when the multimedia console $110_4$ is powered ON.

A graphics processing unit (GPU) 3908 and a video encoder/video codec (coder/decoder) 3914 form a video processing pipeline for high speed and high resolution graphics processing. Data is carried from the GPU 3908 to the video encoder/video codec 3914 via a bus. The video processing pipeline outputs data to an A/V (audio/video) port 3940 for transmission to a television or other display. A memory controller 3910 is connected to the GPU 3908 to facilitate processor access to various types of memory 3912, such as, but not limited to, a RAM.

The multimedia console $110_4$ includes an I/O controller 3920, a system management controller 3922, an audio processing unit 3923, a network interface controller 3924, a first USB (Universal Serial Bus) host controller 3926, a second USB controller 3928, and a front panel I/O subassembly 3930 that are preferably implemented on a module 3918. The USB controllers 3926 and 3928 serve as hosts for peripheral controllers 3942(1) and 3942(2), a wireless adapter 3948, and an external memory device 3946 (e.g., Flash memory, external CD/DVD ROM drive, removable media, etc.). The network interface controller 3924 and/or wireless adapter 3948 provide access to a network (e.g., the Internet, home network, etc.) and may be any of a wide variety of various wired or wireless adapter components including an Ethernet card, a modem, a Bluetooth module, a cable modem, or the like.

System memory 3943 is provided to store application data that is loaded during the boot process. A media drive 3944 is provided and may comprise a DVD/CD drive, hard drive, or other removable media drive, etc. The media drive 3944 may be internal or external to the multimedia console $110_4$. Application data may be accessed via the media drive 3944 for execution, playback, etc. by the multimedia console $110_4$. The media drive 3944 is connected to the I/O controller 3920 via a bus, such as a Serial ATA bus or other high speed connection (e.g., IEEE 1394).

The system management controller 3922 provides a variety of service functions related to assuring availability of the multimedia console $110_4$. The audio processing unit 3923 and an audio codec 3932 form a corresponding audio processing pipeline with high fidelity and stereo processing. Audio data is carried between the audio processing unit 3923 and the audio codec 3932 via a communication link. The audio processing pipeline outputs data to the A/V port 3940 for reproduction by an external audio player or device having audio capabilities.

The front panel I/O subassembly 3930 supports the functionality of the power button 3950 and the eject button 3952, as well as any LEDs (light emitting diodes) or other indicators exposed on the outer surface of the multimedia console $110_4$. A system power supply module 3936 provides power to the components of the multimedia console $110_4$. A fan 3938 cools the circuitry within the multimedia console $110_4$.

The CPU 3901, GPU 3908, memory controller 3910, and various other components within the multimedia console $110_4$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 3943 into memory 3912 and/or caches 3902 and 3904 and executed on the CPU 3901. The application may present a graphical user interface that provides a consistent user experience when navigating to different media types available on the multimedia console $110_4$. In operation, applications and/or other media contained within the media drive 3944 may be launched or played from the media drive 3944 to provide additional functionalities to the multimedia console $110_4$.

The multimedia console $110_4$ may be operated as a standalone system by simply connecting the system to a television or other display. In this standalone mode, the multimedia console $110_4$ allows one or more users to interact with the system, watch movies, or listen to music. However, with the integration of broadband connectivity made available through the network interface controller 3924 or the wireless adapter 3948, the multimedia console $110_4$ may further be operated as a participant in a larger network community.

When the multimedia console $110_4$ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console $110_4$ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 3901 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 3942(1) and 3942(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Based on the foregoing, it may be appreciated that technologies for real-time sharing during a phone call have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present invention, which is set forth in the following claims.

What is claimed:

1. One or more computer-readable memories comprising processor-executable instructions which, when executed by one or more processors disposed in a local device, cause the processors to:

expose a user interface (UI) on the local device for initiating real-time sharing of content during an active phone call between the local device and a remote device;

receive input at a digital assistant instantiated on the local device;

parse, at the digital assistant and during the active phone call, the input to identify a selection of content that was referenced in the input from among a collection of shareable content, the collection of shareable content being locally available to the local device or available to the local device from a remote source;

receive the selection of content for sharing based on the parsed input;

populate a portion of the UI on the local device with pre-staged content selected for sharing but is yet to be shared with the remote device;

enable within the portion of the UI, preparation of a presentation of the pre-staged content while preventing the remote device from displaying the pre-staged content;

receive an instruction to move the pre-staged content to an active sharing window;

move the pre-staged content to the active sharing window that displays the presently shared content while enabling the local device to control pacing of the presentation of content items within the pre-staged content with the remote device;
provide highlighting tools on the local device for highlighting portions of the presently shared content in the active sharing window; and
provide tools on the local device for creating credits for portions of the presently shared content in the active sharing window, the credits including one or more of animation, identification of shared content that is tagged, links to related content, or links to related user experiences.

2. The one or more computer-readable memories of claim 1 further comprising instructions that cause the processors to:
activate a speakerphone function on the local device when the real-time sharing is initiated.

3. The one or more computer-readable memories of claim 1 further including instructions that cause the processors to:
expose the UI for initiating the real-time sharing as part of a UI exposed by a calling application on the local device, the calling application being one of voice calling application or video calling application.

4. The one or more computer-readable memories of claim 1 further including instructions that cause the processors to:
provide tools for controlling presentation of the shared content items including zooming and panning.

5. The one or more computer-readable memories of claim 1 further comprising instructions that cause the processors to:
configure the portion of the UI comprising the pre-staged content to be a scrollable filmstrip; and
configure the active sharing window to receive from the scrollable filmstrip, the content items of the pre-staged content via a drag and drop operation.

6. The one or more computer-readable memories of claim 5 further including instructions that cause the processors to:
reposition or resize the active sharing window responsive to an instruction.

7. The one or more computer-readable memories of claim 1 further including instructions that cause the processors to:
provide one of telestrating tools or video transport controls when an instance of the presently shared content is video content.

8. The one or more computer-readable memories of claim 1 in which the shareable content is one of live-captured content or previously-captured content.

9. The one or more computer-readable memories of claim 1 in which the tools enable highlighting using one or more of lines, graphic shapes, graphic objects, text, colors, transparency, shading, or animation.

10. The one or more computer-readable memories of claim 1 further comprising providing highlighting tools including tools for at least the application of graphics or tools for text annotations.

11. The one or more computer-readable memories of claim 1, in which:
when a real-time sharing component configured as software is locally installed on one or both of the local or remote devices participating in the real-time sharing, utilizing the real-time sharing component to facilitate sharing over a network between the local and remote devices; and
when the real-time sharing component is not installed on one or both of the local or remote devices, using a web client to interact over the network with a remote service provider which furnishes the shared content to the web client on the respective device.

12. A system, comprising:
one or more processors;
a display that supports a user interface (UI) for interacting with a local device; and
a memory storing computer-readable instructions which, when executed by the one or more processors, cause the processors to:
configure a portion of the UI for preparation of a presentation of content selected for sharing that is yet to be shared and for separation of the content selected for sharing that is yet to be shared from a collection of shareable content,
separate an active sharing window on the UI from the portion of the UI configured for preparation of a presentation of the content selected for sharing that is yet to be shared so that privacy is maintained for the content selected for sharing that is not placed in the active sharing window for sharing with a remote device,
provide tools on the local device for creating credits for the content selected for sharing, the credits including one or more of animation, identification of shared content that is tagged, links to related content, or links to related user experiences,
receive an instruction to control the active sharing window membership by adding the subset of the content selected for sharing to the active sharing window and deleting content from the active sharing window,
share content from the active sharing window with the remote device over a network, the active sharing window being configured so that the local device controls pacing of content sharing from the active sharing window, and
provide, from the local device, temporary control to the remote device such that the remote device is provided permission to temporarily control a presentation of the content displayed on the local and remote devices.

13. The system of claim 12 the memory further comprising instructions that cause the processor to receive interaction with the UI using one of natural language, voice command, gesture, or physical contact using a touchscreen or manipulation of a physical or a virtual control.

14. The system of claim 12 the memory further comprising instructions that cause the processor to invoke the UI from a voice calling application or a video calling application.

15. The system of claim 12 the memory further comprising instructions that cause the processor to provide tools for controlling the highlighting, the tools facilitating one or more of drawing, commenting, zooming, panning, coloring, shading, telestrating, or animating.

16. The system of claim 12 in which the memory further comprises instructions that cause the processor to arrange the active sharing window to show content items in the shared content one at a time under control of the local device.

17. A processor-executable method comprising:
receiving selected content for sharing from among a collection of shareable content, the collection of shareable content being locally available to a local device or available to the local device from a remote source;
populating a user interface (UI) portion on the local device with the selected content that is yet to be shared with a remote device so that the UI portion enables generating a presentation of the selected content that is yet to be shared with the remote device, the selected content is separated from the collection of shareable content and the selected content is also separated from content that is presently shared with the remote device via an active sharing window;

receiving from a user, an instruction to move a content item of the selected content from the portion of the UI to the active sharing window;

displaying within the active sharing window, the content item moved from the portion of the UI to the active sharing window;

providing highlighting tools on the local device for highlighting portions of shared content transmitted to the remote device;

providing tools on the local device for creating credits for portions of the shared content transmitted to the remote device, the credits including one or more of animation, identification of shared content that is tagged, links to related content, or links to related user experiences; and providing, from the local device, temporary control to the remote device such that the remote device is provided permission to temporarily control a presentation of the content.

* * * * *